(12) United States Patent
Acuña-Rohter

(10) Patent No.: US 11,232,447 B2
(45) Date of Patent: *Jan. 25, 2022

(54) SYSTEM AND METHOD FOR ENHANCED TRANSACTION AUTHORIZATION

(71) Applicant: Allowify LLC, Portland, OR (US)

(72) Inventor: José Antonio Acuña-Rohter, Chicago, IL (US)

(73) Assignee: Allowify LLC, Des Plaines, IL (US)

( * ) Notice: Subject to any disclaimer, the term of this patent is extended or adjusted under 35 U.S.C. 154(b) by 1638 days.

This patent is subject to a terminal disclaimer.

(21) Appl. No.: 14/600,870

(22) Filed: Jan. 20, 2015

(65) Prior Publication Data

US 2015/0142595 A1     May 21, 2015

Related U.S. Application Data

(63) Continuation-in-part of application No. 13/834,798, filed on Mar. 15, 2013, now Pat. No. 10,475,029.

(60) Provisional application No. 61/982,230, filed on Apr. 21, 2014, provisional application No. 61/977,510, filed on Apr. 9, 2014, provisional application No. (Continued)

(51) Int. Cl.
*G06Q 20/40* (2012.01)
*G06Q 20/20* (2012.01)
*G06Q 50/00* (2012.01)
*G06Q 30/06* (2012.01)
*G06Q 30/00* (2012.01)

(52) U.S. Cl.
CPC ....... *G06Q 20/4014* (2013.01); *G06Q 20/202* (2013.01); *G06Q 20/40* (2013.01); *G06Q 30/0185* (2013.01); *G06Q 30/06* (2013.01); *G06Q 50/01* (2013.01)

(58) Field of Classification Search
CPC .. G06Q 20/4014; G06Q 20/202; G06Q 20/40; G06Q 30/0185; G06Q 30/06; G06Q 50/01; G06Q 40/00; G06Q 40/02
USPC ..................................................... 705/35-44
See application file for complete search history.

(56) References Cited

U.S. PATENT DOCUMENTS

| | | | |
|---|---|---|---|
| 6,021,397 A | 2/2000 | Jones et al. | |
| 7,039,221 B1 * | 5/2006 | Tumey | G06K 9/00221 382/118 |
| 7,389,913 B2 | 6/2008 | Starrs | |

(Continued)

FOREIGN PATENT DOCUMENTS

| | | |
|---|---|---|
| WO | 00135301 | 5/2001 |
| WO | 2013188062 | 12/2013 |

OTHER PUBLICATIONS

Visa says new app will cut credit-card travel troubles, Feb. 13, 2015, Retrieved on Apr. 21, 2015 from: http://www.cnet.com/news/visa-says-new-app-will-cut-credit-card-travel-troubles/.

(Continued)

*Primary Examiner* — Hani M Kazimi
(74) *Attorney, Agent, or Firm* — Barich IP Law Group

(57) ABSTRACT

The present invention relates to system and method for authorizing a transaction using user data collected from third-party websites/applications/sources, such as social media networks. In operation, collected user data may be compared to a financial data or user data collected during a transaction to identify potential fraud and/or other discrepancies, confirming the identity of the user with a greater degree of accuracy and/or imposing purchase parameters.

3 Claims, 18 Drawing Sheets

Related U.S. Application Data

61/954,043, filed on Mar. 17, 2014, provisional application No. 61/929,379, filed on Jan. 20, 2014.

(56) References Cited

U.S. PATENT DOCUMENTS

| | | | |
|---|---|---|---|
| 7,752,135 | B2 | 7/2010 | Brown et al. |
| 7,793,835 | B1 | 9/2010 | Coggeshall et al. |
| 8,386,353 | B2 | 2/2013 | Hirson et al. |
| 8,831,677 | B2 | 9/2014 | Villa-Real |
| 8,856,894 | B1* | 10/2014 | Dean ............... H04L 63/08 |
| | | | 713/175 |
| 2001/0042785 | A1 | 11/2001 | Walker et al. |
| 2002/0123971 | A1* | 9/2002 | Maritzen ........... G06Q 20/02 |
| | | | 705/64 |
| 2004/0117302 | A1 | 6/2004 | Weichert et al. |
| 2007/0084913 | A1* | 4/2007 | Weston ............. H04W 4/021 |
| | | | 235/380 |
| 2008/0140576 | A1 | 6/2008 | Lewis et al. |
| 2009/0094669 | A1 | 4/2009 | Savadi et al. |
| 2011/0208601 | A1 | 8/2011 | Ferguson et al. |
| 2012/0030116 | A1 | 2/2012 | Shirey et al. |
| 2012/0143722 | A1 | 6/2012 | John |
| 2012/0196568 | A1 | 8/2012 | Bakshi |
| 2012/0253957 | A1 | 10/2012 | Bakshi |
| 2012/0330840 | A1 | 12/2012 | Stinchcombe |
| 2013/0030934 | A1 | 1/2013 | Bakshi et al. |
| 2013/0046692 | A1 | 2/2013 | Grigg et al. |
| 2013/0054340 | A1 | 2/2013 | Lehman |
| 2013/0054469 | A1 | 2/2013 | Agashe et al. |
| 2013/0060701 | A1 | 3/2013 | Moon et al. |
| 2013/0066763 | A1 | 3/2013 | Baker et al. |
| 2013/0067547 | A1 | 3/2013 | Thavasi et al. |
| 2013/0090998 | A1* | 4/2013 | Shimogori ....... G06Q 30/0609 |
| | | | 705/14.23 |
| 2013/0275222 | A1 | 10/2013 | Amaro et al. |
| 2013/0275308 | A1 | 10/2013 | Paraskeva et al. |
| 2014/0101052 | A1 | 4/2014 | Song et al. |
| 2014/0201077 | A1 | 7/2014 | Cama et al. |
| 2014/0250009 | A1 | 9/2014 | Carlson |
| 2014/0258136 | A1 | 9/2014 | Ellis |
| 2014/0282870 | A1 | 9/2014 | Markwordt et al. |
| 2014/0337217 | A1 | 11/2014 | Howe et al. |
| 2015/0020162 | A1 | 1/2015 | Hefetz |
| 2015/0026025 | A1 | 1/2015 | Calman et al. |
| 2015/0073987 | A1 | 3/2015 | Dutt |
| 2015/0081557 | A1 | 3/2015 | Kinfoil et al. |

OTHER PUBLICATIONS

Visa Launches Mobile Location Service to Improve Card Payment Experience When Traveling, Feb. 12, 2015, Retrieved on Apr. 21, 2015 from: http://visatechmatters.tumblr.com/post/110826248690/visa-launches-mobile-location-service-to-improve.

Leveraging Cellular Infrastructure to Improve Fraud Prevention, 2009, Park et al. paper, Georgia Institute of Technology, Retrieved on Apr. 21, 2015 from: http://www.cc.gatech.edu/~traynor/papers/acsac09.pdf.

"Credit Card Fraud Statistics", Statistic Brain, available at www.statisticbrain.com/credit-card-fraud-statistics/ (Accessed Mar. 4, 2013).

Carr, Austin, "Foursquare Syncs With MasterCard, Visa For Merchant Specials," Fast Company, Feb. 25, 2013, available at www.fastcompany.com/3006257/foursquare-syncs-mastercard-visa-merchant-specials (Accessed Mar. 13, 2013).

International Search Report, dated Sep. 12, 2014, PCT/US2014/030154.

IPRP and Written Opinion, dated Sep. 24, 2015, PCT/US2014/030154.

* cited by examiner

SAMPLE ORDER :
```
{
"customer": {
"firstName": "John",
"lastName": "Smith",
"facebookID": "12345678",
"email": "john.smith@gmail.com"
},
"billingAddress": {
"address1": "123 S. Wacker Dr.",
"address2": null,
"city": "Chicago",
"state": "IL",
"zip": "60606",
"country": null,
"fullName": "John Smith",
"firstName": "John",
"middleName": null,
"lastName": "Smith",
"phone": "312-588-2300",
"latitude": "41.8819",
"longitude": "-87.6278"
},
"shippingAddress": null,
"ipAddress": "98.227.80.92"
}
```

SAMPLE REGISTER USER :
```
{
"firstName": "Mary",
"lastName": "Smith",
"email": "mary.smith@gmail.com",
"facebookID": "10000812401 8",
"facebookAppID": "1548529570 6200", "shortToken":
"FacebookAppToken",
"shortTokenExpiration":
1396850400,
"longToken": null,
"longTokenExpiration": null
}
```

SAMPLE TRUST SCORE RESPONSE :
```
{
"score": 95,
"responseCode": 1
}
```

Figure 17

SYSTEM AND METHOD FOR ENHANCED TRANSACTION AUTHORIZATION

CROSS REFERENCE TO RELATED APPLICATIONS

This application is a continuation-in-part of commonly owned U.S. patent application Ser. No. 13/834,798, filed on Mar. 15, 2013, entitled "System and Method for Consumer Fraud Protection" by José Antonio Acuña-Rohter. This application further claims priority to U.S. Provisional Patent Application Nos. 61/929,379, filed on Jan. 20, 2014; 61/954,043, filed on Mar. 17, 2014; 61/977,510, filed on Apr. 9, 2014; and 61/982,230, filed on Apr. 21, 2014, each entitled "System and Method for Consumer Fraud Protection" by José Antonio Acuña-Rohter. Each application is hereby incorporated by reference in their entirety.

TECHNICAL FIELD

The present invention relates to systems and methods for consumer fraud protection and transaction authentication. More specifically, the present invention relates to a system and method for authorizing a transaction using third-party data and/or trusted data.

BACKGROUND

Credit card fraud is a crime that has affected about ten percent of the American population, with a median fraudulent transaction value of 399 U.S. dollars. Globally, the total amount of transactions involved in credit card fraud added up to about 5.5 billion U.S. dollars in 2012. The majority of credit card fraud being perpetrated by either using counterfeit cards (about 37%) and/or lost/stolen cards (about 23%), which often occur at a point of sale.

Existing technology attempts to alleviate the problem of correctly authorizing financial transactions by using computationally complex heuristics and expensive computer systems to determine if a transaction matches the profile or behavior of the authorized end-user. However, heuristics are complex, computationally expensive, data-intensive, relatively slow algorithms and have success rates of varying degrees. Specifically, current heuristics and computational power fail to meet the needs of consumers because of, but not limited to, the following reasons: (a) end-users are incorrectly flagged as having made an unauthorized transaction; (b) fraudulent transactions are not flagged as having made an unauthorized transaction; (c) analysis of transactions is done asynchronously out-of-band so transactions are allowed to complete before fraud is detected; and (d) they do not have access to a user's real-time data. Despite the prior attempts to improve financial transaction fraud protection, a need exists for a system and method for financial authorization (e.g., credit card transactions) based on third-party data, such as social media data, end-user applications, trusted applications, and/or other trusted data, to reduce the reliance on ineffective fraud detection heuristics and expensive computing power.

SUMMARY OF THE INVENTION

The present disclosure is directed to a system and method for credit card transaction authorization based on social media data and/or other trusted data. The present also disclosure a system and method for facilitated credit card transaction authorization using an application embodied within a portable device, such as a smart phone.

According to a first aspect of the present invention, a transaction authorization system for managing financial transactions, the transaction authorization system comprises: a non-transitory data storage device; a data transmission device; a processor operatively coupled to the non-transitory data storage device and the data transmission device, wherein the processor is communicatively coupled with a point-of-sale system and a third-party non-transitory information storage device, wherein the processor retrieves transaction data associated with a transaction by a customer from the point-of-sale system via the data transmission device, wherein the processor retrieves user data associated with an account holder from the third-party non-transitory information storage device via the data transmission device, and wherein the processor is configured to authorize the transaction if the customer is determined to be (a) the account holder, or (b) an individual authorized by the account holder.

According to a second aspect of the present invention, a process for authorizing a financial transaction comprising the steps of: receiving transaction data related to said financial transaction from a financial institution over a communication network; receiving user data from a third-party information source; and comparing said transaction data to said user data to authorize or deny said financial transaction.

According to a third aspect of the present invention, a computer-implemented process for authorizing financial transactions, the computer-implemented process comprises the steps of: retrieving, by one or more computers, transaction data associated with a financial transaction from a non-transitory storage device associated with a financial institution's server over a communication network, wherein said transaction data comprises data representing at least one attribute descriptive of said financial transaction; retrieving, by the use of one or more computers, user data from a non-transitory storage device associated with a third-party information source, wherein said user data comprises (i) data representing at least one attribute descriptive of an authorized financial transaction, or (ii) data representing at least one attribute descriptive of an unauthorized financial transaction; comparing, by the one or more computers, said transaction data to said user data to generate (i) an authorization flag, (ii) a denial flag, wherein the authorization flag is generated when said at least one attribute descriptive of said transaction data substantially matches said at least one attribute descriptive of an authorized financial transaction, wherein the denial flag is generated when said at least one attribute descriptive of said transaction data substantially matches said at least one attribute descriptive of an unauthorized financial transaction, (iii) a further review flag, wherein the further review flag is generated when (a) a authorization flag is not generated, and (b) when said at least one attribute descriptive of said transaction data does not substantially match said at least one attribute descriptive of an unauthorized financial transaction; and communicating, by the one or more computers, (i) the generated denial flag, or (ii) the generated authorization flag to said financial institution's server over a communication network, whereby the financial transaction is authorized when the generated authorization flag is communicated by the one or more computers.

According to a fourth aspect of the present invention, a transaction authorization system for managing financial transactions, said transaction authorization system comprises: a non-transitory data storage device for storing a database linking at least one financial account at a financial institution with at least one third-party information source; and at least one processor, operatively coupled to the non-transitory data storage device, said at least one processor configured to: retrieve transaction data associated with a financial transaction from a non-transitory storage device associated with a financial institution's server over a communication network, wherein said transaction data comprises data representing at least one attribute descriptive of said financial transaction; retrieve user data from a non-transitory data storage device associated with said at least one third-party information source over a communication network, wherein said user data comprises (i) data representing at least one attribute descriptive of an authorized financial transaction, or (ii) data representing at least one attribute descriptive of an unauthorized financial transaction; compare said transaction data to said user data to generate (i) an authorization flag, or (ii) a denial flag, wherein the authorization flag is generated when said at least one attribute descriptive of said transaction data substantially matches said at least one attribute descriptive of an authorized financial transactions, wherein the denial flag is generated when said at least one attribute descriptive of said transaction data substantially matches said at least one attribute descriptive of an unauthorized financial transaction; and communicate (i) the generated denial flag, or (ii) the generated authorization flag to said financial institution's server over the communication network.

According to a fifth aspect of the present invention, a transaction authorization system for authorizing a credit card transaction, said transaction authorization system comprises: a non-transitory data storage device for storing a database linking at least one credit card account at a financial institution with at least one user account associated with a third-party information source; and at least one processor, operatively coupled to the non-transitory data storage device, said at least one processor configured to: retrieve transaction data associated with a credit card transaction from a non-transitory storage device associated with a merchant over a communication network, wherein said transaction data comprises data representing at least one attribute descriptive of said credit card transaction; retrieve user data from a non-transitory storage device associated with the third-party information source over a communication network, wherein said user data comprises (i) data representing at least one attribute descriptive of an authorized financial transaction, or (ii) data representing at least one attribute descriptive of an unauthorized financial transaction; compare said transaction data to said user data to generate (i) an authorization flag, or (ii) a denial flag, wherein the authorization flag is generated when said at least one attribute descriptive of said transaction data substantially matches said at least one attribute descriptive of an authorized financial transaction, wherein the denial flag is generated when said at least one attribute descriptive of said transaction data substantially matches said at least one attribute descriptive of an unauthorized financial transaction; and communicate (i) the generated denial flag, or (ii) the generated authorization flag to said financial institution's server over the communication network.

According to a sixth aspect of the present invention, a transaction authorization system for managing transactions comprises: a non-transitory data storage device; a data transmission device; a processor operatively coupled to the non-transitory data storage device and the data transmission device, wherein the processor is communicatively coupled with a point-of-sale system and a trusted data storage device, wherein the processor retrieves transaction data associated with a transaction by a customer from the point-of-sale system via the data transmission device, wherein the processor retrieves user data associated with an account holder from the trusted data storage device via the data transmission device, and wherein the processor is configured to authorize the transaction if the customer is determined to be (a) the account holder, or (b) an individual authorized by the account holder.

According to a seventh aspect of the present invention comprises: means for retrieving transaction data associated with a financial transaction from a non-transitory storage device associated with a financial institution's server over a communication network, wherein said transaction data comprises data representing at least one attribute descriptive of said financial transaction; means for retrieving user data from a non-transitory storage device associated with a third-party information source, wherein said user data comprises (i) data representing at least one attribute descriptive of an authorized financial transaction, or (ii) data representing at least one attribute descriptive of an unauthorized financial transaction; means for comparing said transaction data to said user data to generate (i) an authorization flag or (ii) a denial flag, wherein the authorization flag is generated when said at least one attribute descriptive of said transaction data substantially matches said at least one attribute descriptive of an authorized financial transaction, wherein the denial flag is generated when said at least one attribute descriptive of said transaction data substantially matches said at least one attribute descriptive of an unauthorized financial transaction; and means for communicating (i) the generated denial flag or (ii) the generated authorization flag to said financial institution's server over a communication network, wherein the financial transaction is authorized when the generated authorization flag is communicated by the one or more computers.

In certain aspects, said trusted data storage device is affiliated with a social media network, or a user-interface terminal.

In certain aspects, said processor is configured to communicate at least a portion of said user data from said trusted data storage device to said point-of-sale system.

In certain aspects, said point-of-sale system comprises a display and wherein said at least a portion of said user data is displayed on said display.

In certain aspects, said at least a portion of said user data displayed on said display is an image of (a) the account holder or (b) an individual authorized by the account holder.

In certain aspects, a transaction operator indicates to the processor, via the point-of-sale system's user interface, whether the customer matches the image displayed on said display.

In certain aspects, said processor is configured to: (1) receive an image from the point-of-sale system; (2) compare said image to a trusted image; and (3) authorize the transaction if said image matches said trusted image.

In certain aspects, (a) said image is an image of the customer acquired at the time of the transaction; and (b) said trusted image is an image of the account holder or an individual authorized by the account holder.

In certain aspects, said processor employs facial recognition processing techniques to compare said image to said trusted image.

In certain aspects, said processor is configured to: (1) receive a transaction location from the point-of-sale system; (2) compare said transaction location to a trusted location;

and (3) authorize the transaction if said transaction location is within a predetermined distance of said trusted location.

In certain aspects, said processor is configured to: (1) receive a transaction location from the point-of-sale system; (2) compare said transaction location to a recent location associated with the account holder or an individual authorized by the account holder; and (3) authorize the transaction if said transaction location is within a predetermined distance of said recent location.

In certain aspects, said processor is configured to: (1) retrieve a predetermined profession profile for the account holder from the non transitory data storage device; (2) compare at least a portion of said transaction data to said predetermined profession profile; and (3) authorize the transaction if said at least a portion of said transaction data is consistent with said predetermined profession profile.

In certain aspects, said processor is configured to: (1) retrieve a string of text from the trusted data storage device; (2) extract one or more keywords from said string of text; (3) comparing said one or more keywords to said transaction data; and (4) authorize the transaction if at least one of said one or more keywords matches at least a portion of said transaction data.

In certain aspects, said processor is configured to: (1) retrieve historic data for the account holder from the non-transitory data storage device; (2) compare at least a portion of said transaction data to said historic data; and (3) authorize the transaction if said at least a portion of said transaction data is consistent with said historic data.

In certain aspects, said historic data comprises historic data comprises historic transaction data or historic user data.

In certain aspects, said at least a portion of said user data displayed on said display is data associated with the account holder's social media profile.

In certain aspects, a transaction operator indicates to the processor, via the point-of-sale system's user interface, whether the customer appears to be the account holder based on the data displayed on said display.

In certain aspects, said string of text is: (1) received from trusted data storage device associated with a social media network; and (2) used when a key value pair is not available.

In certain aspects, said user data is associated with a user and said data representing at least one attribute descriptive of an authorized financial transaction describes a recent user location and said financial data comprises data representing attributes descriptive of a merchant location, wherein said recent user location is communicated to said third-party information source by said user within a predetermined period of time of said financial transaction, and wherein said recent user location substantially matches said merchant location when said recent user location is determined by the one or more computers to be within a predetermined distance of the merchant location.

In certain aspects, said user data is associated with a user and said data representing at least one attribute descriptive of an authorized financial transaction describes a trusted location and said financial data comprises data representing attributes descriptive of a merchant location, wherein said trusted location is communicated to said third-party information source by said user within a predetermined period of time of said financial transaction, and wherein said trusted location substantially matches said merchant location when said trusted location is determined by the one or more computers to be within a predetermined distance of the merchant location.

In certain aspects, said user data may be selected from a list of approved merchants, a shared location, a user behavior, a calendar event, type of purchases (e.g., allow/block internet purchases), automatic teller machine (ATM) usage (e.g., allow/disallow cash withdrawals), transaction limits, time/date limitation, etc. In some embodiments, said third-party information source is a social media network.

In certain aspects, financial transaction may be related to a financial account at said financial institution that is linked to a user account at said third-party information source by a user. In order to facilitate said financial transaction, said financial institution may be authorized to retrieve said user data prior to authorizing said financial transaction.

In some aspects, if said financial data comprises a transaction location, said financial transaction may be authorized if said transaction location is within a predetermined distance of said user data. In another aspect, if said financial data comprises a merchant name, said financial transaction is authorized if said merchant name is contained in said user data.

If said financial data comprises a transaction category type, said financial transaction may be authorized if said transaction category type is contained in said user data. In some aspects, if said user data comprises a list of approved behavior types, said financial transaction is authorized if said approved behavior type matches a behavior type contained in said financial data.

In another aspect, if said user data comprises a list of prohibited behavior types, said financial transaction is denied if said prohibited behavior type matches a behavior type contained in said financial data. In a further aspect, if said user data comprises a user location and said financial data comprises a merchant location, said financial transaction is authorized if said user location is within a predetermined distance of said merchant location.

In some aspects, said user data comprises a transaction category related to a calendar event. In this circumstance, said financial transaction is authorized if said transaction category is contained in said financial data and a date of said financial transaction is within a predetermined date range of a date of said calendar event.

In another aspect, said financial data comprises a transaction merchant name and said user data comprises a list of blocked merchant names. Said financial transaction is denied if said transaction merchant name is contained in said list of blocked merchant names.

In some aspects, if said financial transaction is denied, a heuristic module or a miscellaneous module may be utilized to authorize or deny said financial transaction.

According to another aspect of the present invention, provided it is a transaction authorization system for managing financial transactions, said transaction authorization system comprising: a data storage device storing a database linking at least one financial account at a financial institution with at least one third-party information source; and at least one processor, operatively coupled to the data storage device, wherein, when financial data related to a financial transaction for the at least one financial account is received at said transaction authorization system, said at least one processor (a) retrieves user data from said third-party information source and (b) compares said financial data to said user data to authorize or deny said financial transaction. The transaction authorization system may be located at said financial institution or elsewhere.

In some aspects, a linking module is provided that allows a user to link said at least one financial account to said at least one third-party information source. The linking module can also be used to allow a user to link a second financial account to said at least one third-party information source and store said link in said database.

DESCRIPTION OF THE DRAWINGS

These and other advantages of the present invention will be readily understood with reference to the following specifications and attached drawings wherein:

FIG. 17 illustrates example objects for use in an Enhanced Transaction Authorization System processing.

DETAILED DESCRIPTION

Figure 1:
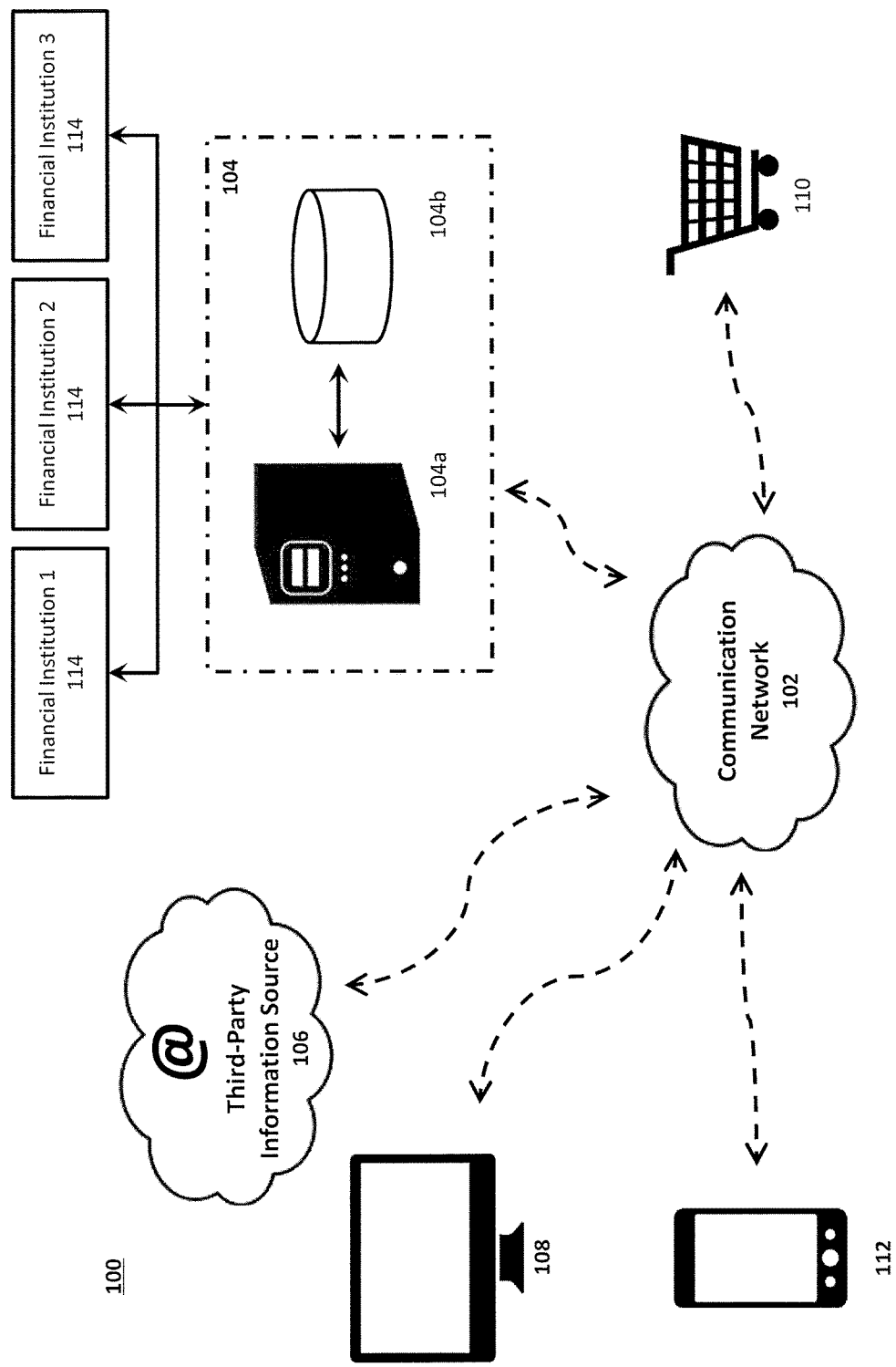
FIG. 1 is a block diagram illustrating an example Enhanced Transaction Authorization System for authorizing a financial transaction using trusted data from, for example, a third-party data source.

Preferred embodiments of the present invention will be described herein below with reference to the accompanying drawings. In the following description, well-known functions or constructions are not described in detail because they may obscure the invention with unnecessary detail. The present invention relates to a system and method for authorizing a transaction using third-party data and/or real-time user-provided data. For this disclosure, the following terms and definitions shall apply:

As used herein, the word "exemplary" means "serving as an example, instance, or illustration." The embodiments described herein are not limiting, but rather are exemplary only. It should be understood that the described embodiments are not necessarily to be construed as preferred or advantageous over other embodiments. Moreover, the terms "embodiments of the invention," "embodiments," or "invention" do not require that all embodiments of the invention include the discussed feature, advantage, or mode of operation.

The terms "communicate" and "communicating" as used herein to include both conveying data from a source to a destination and delivering data to a communications medium, system, channel, network, device, wire, cable, fiber, circuit, and/or link to be conveyed to a destination. The term "communication" as used herein means data so conveyed or delivered. The term "communications" as used herein includes one or more of a communications medium, system, channel, network, device, wire, cable, fiber, circuit, and link.

The terms "coupled," "coupled to," and "coupled with" as used herein, each mean a relationship between or among two or more devices, apparatuses, files, circuits, elements, functions, operations, processes, programs, media, components, networks, systems, subsystems, and/or means, constituting any one or more of (i) a connection, whether direct or through one or more other devices, apparatuses, files, circuits, elements, functions, operations, processes, programs, media, components, networks, systems, subsystems or means, (ii) a communications relationship, whether direct or through one or more other devices, apparatuses, files, circuits, elements, functions, operations, processes, programs, media, components, networks, systems, subsystems or means, and/or (iii) a functional relationship in which the operation of any one or more devices, apparatuses, files, circuits, elements, functions, operations, processes, programs, media, components, networks, systems, subsystems, or means depends, in whole or in part, on the operation of any one or more others thereof.

The term "data" as used herein means any indicia, signals, marks, symbols, domains, symbol sets, representations, and any other physical form or forms representing information, whether permanent or temporary, whether visible, audible, acoustic, electric, magnetic, electromagnetic, or otherwise manifested. The term "data" is used to represent predetermined information in one physical form, encompassing any and all representations of corresponding information in a different physical form or forms.

The term "database" as used herein means an organized body of related data, regardless of the manner in which the data or the organized body thereof is represented. For example, the organized body of related data may be in the form of one or more of a table, a map, a grid, a packet, a datagram, a frame, a file, an e-mail, a message, a document, a report, or a list or in any other form.

The term "network" as used herein includes both networks and inter-networks of all kinds, including the Internet, and is not limited to any particular network or inter-network.

The term "processor" as used herein means processing devices, apparatuses, programs, circuits, components, systems, and subsystems, whether implemented in hardware, tangibly embodied software or both, and whether or not programmable. The term "processor" as used herein includes, but is not limited to, one or more computing devices, hardwired circuits, signal-modifying devices and systems, devices and machines for controlling systems, central processing units, programmable devices and systems, field-programmable gate arrays, application-specific integrated circuits, systems on a chip, systems comprising discrete elements and/or circuits, state machines, virtual machines, data processors, processing facilities, and combinations of any of the foregoing.

The term "computer" as used herein means a device, or collection of devices, having a processor and enabled to perform one or more prescribed mathematical and/or logical operations.

The term "point-of-sale system" as used herein refers to a computerized device or system for facilitating a sale and/or transaction and, in certain situations, managing storing data related to the sale and/or transaction.

The term "social media network" refers to a network, application or website that facilitates interaction among people, corporations, and other entities in which they create, share and/or exchange information in virtual communities or networks. Example social media networks include, but are not limited to, Facebook®, MySpace®, Google+®, Twitter®, and Foursquare®.

The term "credit card" refers to a payment method issued to users that facilitates financial transactions including, but not limited to, debit and credit operations.

The "credit card" functionality may be facilitated through, for example, a card having a magnetic strip or radio-frequency identification (RFID), and/or a portable device, such as a phone, tablet, Personal Data Assistance (PDA), etc. For example, a portable device may be configured to be used as a credit card at a point-of-sale system through wireless technologies such as, for instance, RFID, near field communication (NFC), etc.

The term "location" refers to any geographical, physical, or virtual location. For example, the location of a user may be a virtual location (e.g., Amazon.com) or their physical location (e.g., country, state, city, address, etc.). The location may be represented as, without limitation, a uniform resource locator ("URL"), address, physical address, and/or Global Positioning System (GPS) coordinates.

The term "merchant" refers to any entity or person engaged in the sale of commodities, products, entertainment, and/or services. Example merchants include, but are not limited to, physical brick and mortar stores, virtual stores offered through websites, networks or applications that facilitate online shopping (e.g., Amazon®), online payment systems (e.g., PayPal®), and entertainment venues such as movie theatres, casinos, etc.

The term "Check-In" refers to an action by an end-user on a social media network that creates or otherwise provides data related to the end-user's present, recent, and/or historic locations and/or activities. For example, when a user Checks-In, the social media network may be configured to provide the location, type of location, date/time of the Check-In, guests of the end-user, and any other available information.

The term "Like" refers to an action by an end-user on a social media network that flags or otherwise identifies a certain merchant, product, or location as being favored by the end-user. Conversely, if an end-user does not favor a merchant, the end-user may "Dislike" the merchant.

The term "event calendar" refers to a digital calendar that creates or otherwise provides data related to the end-user's past, present, and/or future events. The event calendar may be further configured to provide any location data associated with said past, present, and/or future events.

The term "Post" refers to text, an image, a comment, or any other information that is provided as part of an end-user's social stream.

The term "digital asset" refers to a tangible or intangible property that exists, is transferrable, or stored in digital form. Example digital assets include, but are not limited to, digital music, digital gift cards, software, digital books, digital movies, etc.

During a financial transaction, it is important to confirm the identity of an end-user, or the legitimacy of transaction, prior to completion of the transaction. Accordingly, to reduce the risk of fraud, data collected during a financial transaction should be compared to trusted data, such data collected from the end-user or other trusted data sources. Other trusted data sources may include, for example, one or more data sources that are authorized (or trusted) by the end-user to provide data about the end-user. Such data may be queried from another person's social media network profile, or retrieved from a database of trusted data, which may be established, updated, and/or otherwise controlled by the end-user or, in certain aspects, a financial institution. For example, an authorized family member may "Check-In" on behalf of the end-user to establish a location, or certain activities, purchases, and the like may be pre-authorized. Similarly, a list of trusted social media network connections (e.g., a "Facebook friend") may be authorized to Check-In the end-user, thereby generating trusted data. Further, as will be discussed below, one or more user accounts may be linked such that trusted data from one account may be used to authorize the other account.

However, using existing methods, available trusted data is generally limited and/or static. Thus, this limited and/or static trusted data does not necessarily provide an accurate indication of the user's recent location, present location, future locations, preferred merchants, or anticipated spending habits. Similarly, the amount and type of data collected during an average transaction with a merchant is generally limited to information about the merchant's location, category of services, and the value of the transaction (e.g., the amount of money exchanged). Accordingly, to augment fraud detection, it is advantageous to collect user data in real-time from third-party sources and/or other trusted data sources. The collected real-time user data may be used to confirm the credentials, or other identifying qualities, of the end-user with a greater degree of accuracy.

While the present invention in generally described in the context of financial transactions, the teachings and principles of the present invention may be applied to any transaction that may be deemed important, sensitive in nature or where the validity of the transaction must be authenticated (whether or not financial in nature), without departing from the spirit and scope of the invention; including, for example, transactions including finances, human rights, privacy, and virtually any other transaction known to those skilled in the art.

Undoubtedly, over the past decade, social media networks have become increasingly popular as they enable a user to communicate, monitor friends, and meet new people within a network. With the explosion of portable electronic devices, such as smartphones, tablets, and laptop computers, end-users generate an increasing amount of user data on a daily and even real-time basis. Moreover, such user data is typically dynamic and generally includes information about the user, such as their present location, future locations, past locations (e.g., recent locations), daily activities, plans, events, interests, Likes, Dislikes, etc. Indeed, user data is often made available over the Internet to the end-user and other users in a particular network (e.g., a predetermined group of users) through third-party websites or applications, such as social media networks or applications.

Thus, while social media networks and other applications serve a primary purpose of enabling social communication between users, user data generated and/or collected by such social media networks and other applications may be used to authenticate an end-user, or group of users, during a financial transaction. Accordingly, user data may be retrieved from, for example, a third-party network and used during a financial transaction's user authentication process. For example, an end-user may link one or more financial accounts (e.g., credit cards) with one or more third-party networks (e.g., social media networks) and/or trusted data sources to facilitate communication of user data therebetween. Once communication is established, a financial institution responsible for the one or more financial accounts may dynamically retrieve available user data from a social media network and/or trusted data sources and employ the user data in the financial institution's fraud detection algorithm. Examples of financial institutions include, without limitation, banks, credit card companies, and any other an institutions that provides financial services for its clients or members.

Consequently, the financial institution may compare collected user data to any transaction data collected during a financial transaction to identify potential fraud and/or other discrepancies. For example, if a transaction is initiated in Chicago using a credit card, but the end-user associated with the credit card resides in San Francisco, the financial institution may query one or more social media networks and/or trusted data sources to determine whether the user may be on vacation in Chicago. User data related to a user's present location that is often available through social media networks, includes without limitation: Check-Ins, login location, posting-location, event location from a calendar, etc. The end-user may conveniently control and/or modify one or more parameters of enhanced transaction authorization system via one or more computer applications embodied on a portable device, such as a smart phone.

To improve accuracy, an enhanced transaction authorization system need not be confined to a single third-party network or trusted data source, but may be used with a plurality of authorized third-party networks and trusted data sources, including, for example, social media networks, common interest forums and/or e-mail domains (e.g., Gmail.com, Yahoo.com), where the location may be determined using an Internet Protocol (IP) address or any GPS coordinates/cell tower location associated with a portable device.

As will be discussed below, financial institutions may use user data collected via third-party networks and other trusted data source as an input to a transaction authorization system, which may function as an enhanced transaction authorization system. Thereby reducing, or even eliminating the heuristics needed to predict information about a user, thereby further saving computing power, increasing fraud detection accuracy, and decreasing fraud detection system complexity. Accordingly, rather than relying on static data, a financial institution may request user data from a third-party network or trusted data source. More specifically, a process for authorizing a financial transaction may comprise the steps of: receiving transaction data related to said financial transaction from a financial institution, or point-of-sale system, over a communication network; receiving user data (e.g., approved merchants, a shared location, a user behavior, or a calendar event) from a trusted data source or third-party information source (e.g., a social media network); and comparing said transaction data to said user data to authorize or deny said financial transaction based on matches or mismatches. The financial transaction may be related to a financial account, which may be linked to a user account at said third-party information source by a user, at said financial institution. To facilitate user data retrieval, the financial institution may be authorized in advance (i.e., pre-authorized) by the account holder to retrieve said user data prior to authorizing said financial transaction. An account holder, as used herein, generally refers to an individual authorized by a financial entity to move (or credit) funds to or from (e.g., credit, debit, deposit, withdraw, etc.) an account. The account holder may, in certain situations, authorize another individual (e.g., a family member, employee, friend, etc.) to execute transactions using the financial account. In that situation, the person authorized by the account holder would be an agent of the account holder and therefore, from the perspective of the enhanced transaction authorization system, be an equivalent to the account holder.

The present invention may be illustrated by the following example, which is provided to aid in the understanding of the invention and is not to be construed as a limitation thereof.

FIG. 1 illustrates an example Enhanced Transaction Authorization System 100 for authorizing and/or authenticating a financial transaction using third-party data (e.g., data pulled from a third-party data source, such as a social media website) or other trusted data. One of skill in the art, however, would recognize that the Enhanced Transaction Authorization System 100 need not be limited to detection of fraud, but rather my include systems for authenticating, authorizing, and/or prohibiting particular transactions, using, for example, social media data, other trusted data and/or purchase parameters. As illustrated, the Enhanced Transaction Authorization System 100 may comprise a Communication Network 102 (e.g., the Internet) that is communicatively coupled with, for example, a Transaction Authorization System 104, Third-Party Information Source 106, Point-of-Sale System (POS System) 110, one or more trusted database, and one or more user-interface terminals, such as a Computer Terminal 108 and/or Portable Terminal 112.

The Enhanced Transaction Authorization System 100 and/or the Transaction Authorization System 104 may be configured to provide real-time data and real-time authentication functionality, which is typically not possible with traditional methods such as, for example, manual review. Further, in many situations, such real-time data and real-time authentication obviates the need for an end-user to notify the financial institution when traveling (or other inconsistent behavior) because the trusted data (whether inputted by the user, pulled from a third party network, or determined using the location of a device) would indicate that a new location or potentially different behavior. The Enhanced Transaction Authorization System 100 and/or the Transaction Authorization System 104 improve the functionality of POS devices and transaction providers by cost effectively reducing fraudulent/unwanted transactions.

While the Communication Network 102 is illustrated as a single network, one of skill in the art would recognize that one or more communication networks may be used to facilitate communication between the various components of the Enhanced Transaction Authorization System 100. Indeed, an encrypted communication channel, such as Secure Sockets Layer (SSL), may be employed to communicate data between, for example, the POS System 110 and the Transaction Authorization System 104.

The POS System 110 may be operated by a merchant and used to process transactions between an end-user and the merchant by drawing funds, or crediting, an account with a financial institution, whether physically (e.g., via brick and mortar store) or virtually (e.g., online shopping). For example, the POS System 110 may be a physical credit card processing machine or online credit card processing system, such as PayPal® or Authorize.net. In certain aspect, the POS System 110 and financial institution 114 may be a single system or entity whereby the financial institution 114 facilitates and/or operates the POS System 110. Indeed, certain entities may provide both point of system functionality and banking functionality (e.g., credit/debit) to the end-user, while perhaps also offering third-party banking functionality (e.g., linking to a separate credit/debit card company).

As used herein, absent fraud on behalf of the end-user (e.g., the customer who is interacting with the merchant), the end-user and the account holder (or a person authorized by the account holder) may be the same person.

An exemplary POS System 110 may include a cash register, a computer, a display (e.g., a monitor), cash drawer, receipt printer, customer display, and/or a debit/credit card reader. A POS System 110 may employ touch-screen technology (e.g., a touch-sensitive liquid crystal display). The debit/credit card reader may be a device configured to read, or retrieve, debit/credit card information using, for example, a magnetic strip reader, RFID, NFC, etc. Depending on the needs of the merchant, the POS System 110 may further comprise a conveyor belt, weight scale, integrated credit card processing system, a signature capture device, and a customer personal identification number (PIN) pad device. The POS System 110 may include an interface that communicates data with independent applications. In certain aspects, the POS System 110, or associated functionality, may be facilitated using a portable device, such as mobile phones, PDAs, and tablets.

The Third-Party Information Source 106 represents one or more third-party websites, networks, applications and/or databases, such as social media networks, or a data feed therefrom (e.g., Facebook's news feed). The Third-Party Information Source 106 may be configured to communicate user data associated with an end-user from the end-user's one or more third-party websites to the Transaction Authorization System 104.

Transaction Authorization System 104 may be used to facilitate fraud detection functionality for the Enhanced Transaction Authorization System 100. The Transaction Authorization System 104 generally comprises (1) a computer 104a, or data center of computers, configured to perform one or more fraud detection algorithms/protocols, and (2) a database 104b or cluster of databases for storing, among other things, trusted data. Thus, the database 104b may further function as a trusted data source. Indeed, the database 104b may store a plurality of end-user's preferences for a given credit card, whereby the preferences are determined by the end-user and can be updated to meet the end-user's desired preference via, for example, a Computer Terminal 108, Portable Terminal 112, or the financial institution 114 associated with the credit card.

The computer 104a may be communicatively coupled with a non-transitory computer-readable medium having computer-executable instructions embodied thereon. The computer-executable instructions, when executed by the computer, facilitate authentication using one or more bits of user data retrieved from a third-party information source, such as Third-Party Information Source 106, and/or a trusted data source. The database 104b may be further configured to store user data received from the Third-Party Information Source 106 and/or transaction data collected during a transaction. Transaction data associated with a financial transaction may be retrieved from, for example, a non-transitory storage device associated with a financial institution 114's server over a communication network 102. In operation, the Transaction Authorization System 104 may use trusted data and/or user data to authenticate the end-user and to determine if a transaction is valid, potentially fraudulent, or fraudulent. Generally speaking, the Transaction Authorization System 104 acts as a protective barrier between the POS System 110 and the end-user's financial institution 114. Thus, the Transaction Authorization System 104 may be configured to allow a transaction, deny a transaction, flag the transaction for additional review, and/or calculate a trust score value associated with a given transaction.

In certain aspects, the trust score value may be based on a scale of 1 to 100 whereby transactions are approved when a predetermined authorize trust score is achieved. Indeed, certain inconsistencies between the trusted data and the transaction data cause the trust score value to decrease pursuant to a predetermined algorithm, conversely, consistencies (or pre-authorized transactions) may cause the trust score value to increase pursuant to a predetermined algorithm. For example, if the location of the end-user is determined to be 100 miles away from the location of the transaction, the trust score value may be decreased by X, while the trust score value may be decreased by Y when the location of the end-user is determined to be 1,000 miles away from the location of the transaction.

As illustrated, one or more financial institutions 114 may be coupled with the Transaction Authorization System 104. Accordingly, in certain embodiments, a single Transaction Authorization System 104 may be coupled with two or more financial institutions 114. Alternatively, each financial institution 114 may be coupled with a single Transaction Authorization System 104. Moreover, the Transaction Authorization System 104 may be hosted, operated and/or facilitated by a third party or the financial institution 114. In certain embodiments, the Transaction Authorization System 104, or functionality thereof, may be integrated with, and/or performed by, the POS System 110. The Transaction Authorization System 104 may further be implemented by the end user's Computer Terminal 108 and/or Portable Terminal 112 via, for example, an application embodied thereon. For example, the preferences for purchase parameters (e.g., transaction limit, purchase type, location, etc.) may be implemented via an application residing on the Computer Terminal 108 and/or Portable Terminal 112 as a first level filter. In operation, the purchase parameters also reside on the Transaction Authorization System 104 or other database, but may also be cached on the Computer Terminal 108 and/or Portable Terminal 112.

One of ordinary skill in the art would recognize, however, that the teachings of the present disclosure (such as the Transaction Authorization System 104, the various associated fraud detection methods, the Enhanced Transaction Authorization System 100 functionality, etc.) may be facilitated or provided by virtually any entity who wishes to employ or provide fraud protection services or methods, including, without limitation, merchants, third-party auditors, government entities, and customers. For example, in certain situations, it may be advantageous to perform fraud detection methods during a transaction, but before the transaction's request for funding is communicated to the financial institution 114 (or other funding source) for processing. Accordingly, the Transaction Authorization System 104 and associated fraud methodology may be employed during checkout, but prior to completion of the checkout (e.g., prior to order fulfillment and/or order confirmation). For example, a merchant may use the Transaction Authorization System 104 to pre-screen a transaction, or potential transaction, during the checkout process (e.g., dynamically, or shortly thereafter), which would enable the merchant to identify potential fraud prior to completion of the transaction, thereby avoiding (or mitigating) unnecessary costs and hassle associated with order fulfillment (e.g., shipping and/or dealing with the financial institution 114). Similarly, the Transaction Authorization System 104 may reside on the end user's device (e.g., Computer Terminal 108 and/or Portable Terminal 112) and used to implement purchase parameters. Such an embodiment may be particularly useful when used in connection with a virtual wallet (e.g., when using a portable device, such as a smart phone, as a payment method during a transaction) and/or managed accounts whereby a primary account holder is able to implement restrictions on the account users (e.g., corporate account and/or family accounts). Therefore, while the present disclosure's examples generally describe a financial institution 114 as the provider (e.g., operator or controller) of the Transaction Authorization System 104, the teachings of the present disclosure should not be limited to financial institution 114. On the contrary, the teachings and principles of the present invention may be applied to merchants, third-party auditors, government entities, customers, and virtually any other entity desirous of providing fraud detection known to those skilled in the art without departing from the spirit and scope of the invention.

The Enhanced Transaction Authorization System 100 may further include one or more end-user terminals, such as a Computer Terminal 108 and/or Portable Terminal 112. The Computer Terminal 108 may be, for example, a desktop computer while the Portable Terminal 112 may be, for example, a PDA, mobile phone, tablet, laptop computer, etc. Portable Terminal 112 may comprise a display, computer, a means for communicating, such as wireless communication (e.g., a transceiver/receiver configure to communicate over Wi-Fi, a cellular network, NFC, RFID, etc.), and a means for providing data indicative of the current location (e.g., a GPS transceiver/receiver). The Portable Terminal 112 may be further equipped with, for instance, a processor, memory, data storage device, a touch-sensitive liquid crystal display, keyboard, camera, microphone, speaker, and an operating system and drivers for enabling communication between the Portable Terminal 112's components and general operation of the Portable Terminal 112. In operation, a user may interact with the Portable Terminal 112 or the Transaction Authorization System 104 using the Portable Terminal 112's graphical interface (e.g., via a touch-sensitive liquid crystal display). Additional example means for wireless communication may include cellular modems, baseband processors, and any other transmitter/receiver device that provide a wireless connection to a cellular carrier for voice and/or data transfer (e.g., Global System for Mobile Communication (GSM), General Packet Radio Service (GPRS), 3G, 4G (Long-Term Evolution (LTE)), etc.). Further, the means for wireless communication may employ one or more wireless standards such as Bluetooth (e.g., short-wavelength ultra high frequency (UHF) radio waves in the industrial, scientific and medical (ISM) band from 2.4 to 2.485 GHz), near field communication (NFC), Wi-Fi (e.g., Institute of Electrical and Electronics Engineers' (IEEE) 802.11 standards), etc. In certain embodiments, the Portable Terminal 112 may further comprise a wired connection (e.g., a port or cable) for data transfer, such as FireWire, USB, and/or eSATA.

The end-user may use one or more user terminals to access the POS System 110. For example, the end-user may access the POS System 110 through an online retailer's website via the Computer Terminal 108 and/or Portable Terminal 112. Similarly, the end-user may access one or more third-party information sources, such as social media networks. The one or more end-user terminals may also be used to facilitate communication between the Transaction Authorization System 104 and the end-user. For example, the Transaction Authorization System 104 may notify the end-user of any peculiar or blocked transactions through, for example, e-mail, text, automated call, push notifications to an application, etc.

Figure 2:
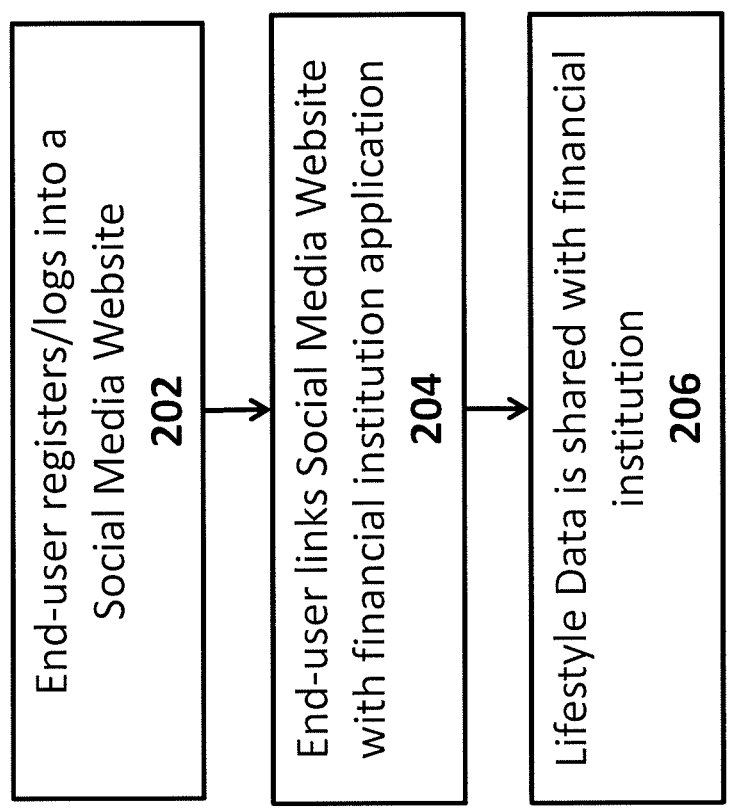
FIG. 2 is a flowchart diagram illustrating an example method of linking one or more financial accounts.

FIG. 2 is a flowchart diagram 200 illustrating an example method of linking one or more financial accounts (e.g., credit cards) with one or more third-party websites (e.g., social media networks) and/or trusted data sources to facilitate communication of user data. In certain aspects, accounts for different end-users may be linked, whereby trusted data from one account may be used to authenticate (or otherwise authorize) the other account. For example, if a couple has linked their accounts and one spouse leaves his or her phone at home, but attempts to complete a transaction outside of the home, the other spouse's phone may be used to authentic the transaction (e.g., the location of the other spouse's phone may be used as the end-user's location for purpose of transaction authorization). While credit cards and social media networks are used in this example, one with skill in the art would appreciate that it is possible to apply the underlying functions to other financial accounts and/or third-party websites or data sources. Therefore, the present disclosure should not be construed to be limited to credit cards and/or social media networks.

At Step 202, the end-user may log into, or otherwise gain access to, a social media network using the end-user's credentials (e.g., a username and password). If the end-user is not yet registered to use the social media network, the end-user may be required to first create an account with the social media network. Once the social media network authenticates the end-user's credentials, the end-user may opt into participating in the Enhanced Transaction Authorization System 100, thereby linking the end-user's social media network profile and/or a trusted data source with that end-user's financial institutions at Step 204. For example, the end-user may link their profile on the social media network with their financial institutions by, for instance, installing an application on an end-user's portable device (e.g., a portable computer or smartphone) or any other method of data linkage.

At Step 206, the end-user may designate the type of user data from the end-user's profile that the end-user wishes to share with their financial institution. Designated user data may include, but is not limited to, past location, present location, future location, merchants they "Like", merchant black lists (i.e., blocked merchants), merchant white lists (i.e., trusted merchants), relationship status, and social event calendars. For example, the merchant black list may broadly include all internet purchases. Social event calendar data could include information related to future information of what an end-user will be doing such as a business trip, vacation, birthday party, or even an anniversary dinner. Relationship status includes information whether an end-user is single, married, or engaged. For example, if an end-user is single and then becomes engaged, the Transaction Authorization System 104 may be configured to anticipate that the end-user may shop at expensive flower shops, jewelry shops, etc. Once a financial account is linked with one or more third-party websites via the Transaction Authorization System 104, the financial institution is permitted to use any designated user data without restriction or further action by the end-user. Accordingly, the end-user need not repeat Steps 202 through 204 unless the end-user wishes to change, or update, one or more settings, and/or link additional third-party websites and/or financial accounts.

Figure 3:
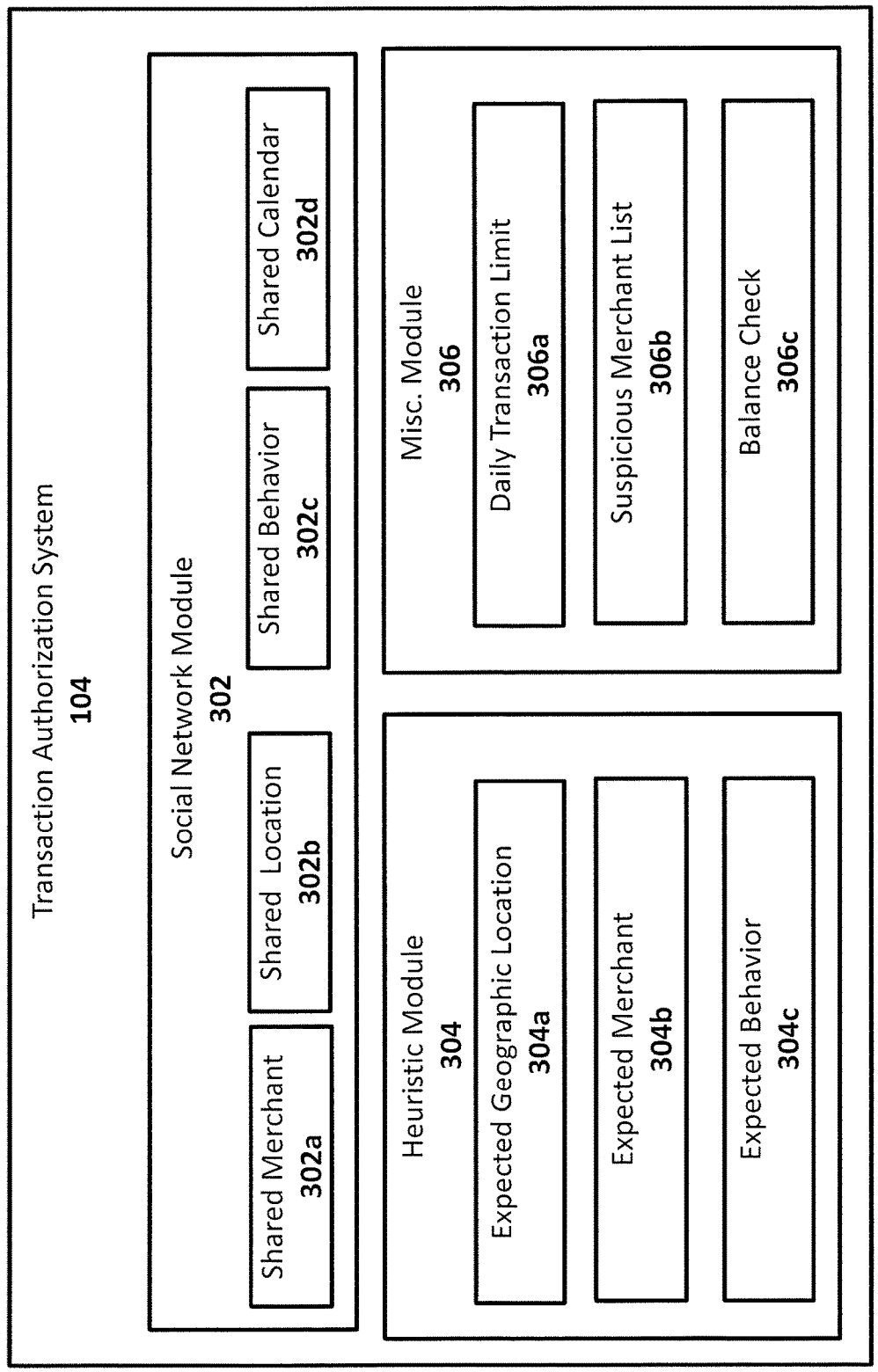
FIG. 3 is a block diagram illustrating an example architecture for a Transaction Authorization Module.

FIG. 3 is a block diagram illustrating exemplary architecture for a Transaction Authorization System 104 according to embodiments of the present invention. As illustrated, while transaction authorization systems may rely on Heuristic Module 304 and other Miscellaneous Module 306 to detect fraud, the Transaction Authorization System 104 may comprise a Social Network Module 302 to aid in fraud protection. By supplementing, or replacing, the Heuristic Module 304 with a Social Network Module 302, the computationally expensive and complex heuristics of modules 304a through 304c may be short-circuited. As a result, performance and reliability may be increased while expenses may be greatly reduced due to decreased hardware and electric power and data center costs (central processing unit (CPU)/hour usage).

Through a Social Network Module 302, financial institutions can receive user data from a social media network. For example, the Social Network Module 302 may be configured to scan, extract, or otherwise receive data stored by a social media network, including at least information provided through the end-user's news feed (e.g., recent Posts, updates, Check-Ins, etc.). The user data can provide, for example, the end-user's Shared Location Module 302b, which is generally the end-user's present location, or, at minimum, a recent location. The user data may further provide information related to: (1) Shared Merchant Module 302a, such as merchants that the end-user likes or otherwise trusts; (2) future locations, which may be accomplished by analyzing the end-user's calendar and may include events such as an anniversary dinner at an expensive restaurant; (3) past locations, to help aid with transaction disputes; or (4) Shared Behavior Module 302c, which may include interests and events such as attending a soccer game so they will buy tickets, organizing a party so they will buy party supplies or eating at a fancy restaurant, or even joining a bowling league, which likely means the end-user will purchase bowling equipment as an example.

Accordingly, the Social Network Module 302 obviates the need to guess what an end-user is doing and eliminates the need for expensive hardware and computationally complex heuristic algorithms. Transaction Authorization System 104 modules may include, for example, Shared Merchant Module 302a, Shared Location Module 302b, Shared Behavior Module 302c, and Shared Calendar Module 302d, which are explained in greater detail in FIGS. 4, 5, 6, and 7 respectively.

Indeed, an end-user can identify merchants that the end-user trusts or does not trust through a social media network, or another trusted data source associated with the end-user. For example, merchants that the end-user Likes (or otherwise endorses, supports, or expresses a positive interest/viewpoint) via the end-user's social media network profile may be added to a "white list," thereby indicating that the merchant is not likely fraudulent. Similarly, merchants that the end-user Dislikes (or otherwise renounces, criticizes, or expresses a negative interest/viewpoint) may be added to a "black list," indicating that the merchant is likely fraudulent, thereby enabling a financial institution to effectively identify potentially fraudulent transactions. Thus, the user data may comprise data relating to one or more merchant names. One or more merchant names may be flagged as approved (white list) or blocked (black list). Accordingly, a financial transaction may be authorized if a merchant name is flagged as approved and denied if the merchant name is flagged as blocked. That is, an authorization flag may be generated by one or more computers in the Transaction Authorization System 104 when the merchant name is flagged as approved and, a denial flag is generated when the merchant name is flagged as blocked. One or more computers may then communicate (i) the generated denial flag and/or (ii) the generated authorization flag to a financial institution's server over a communication network, whereby the financial transaction is authorized when the generated authorization flag is communicated by the one or more computers.

To the extent that user data is unavailable to the Social Network Module 302, or otherwise insufficient, Heuristic Module 304 may be used to identify fraudulent transactions based on existing heuristics algorithms used by financial transaction providers, hence providing a backstop for fraud detection if the Social Network Module 302 does not allow for a short-circuit of modules 304 and 306. Accordingly, the processes illustrated in FIGS. 4 through 7 may be employed once one or more financial accounts are linked with one or more third-party data sources to facilitate communication of user data.

Figure 4:
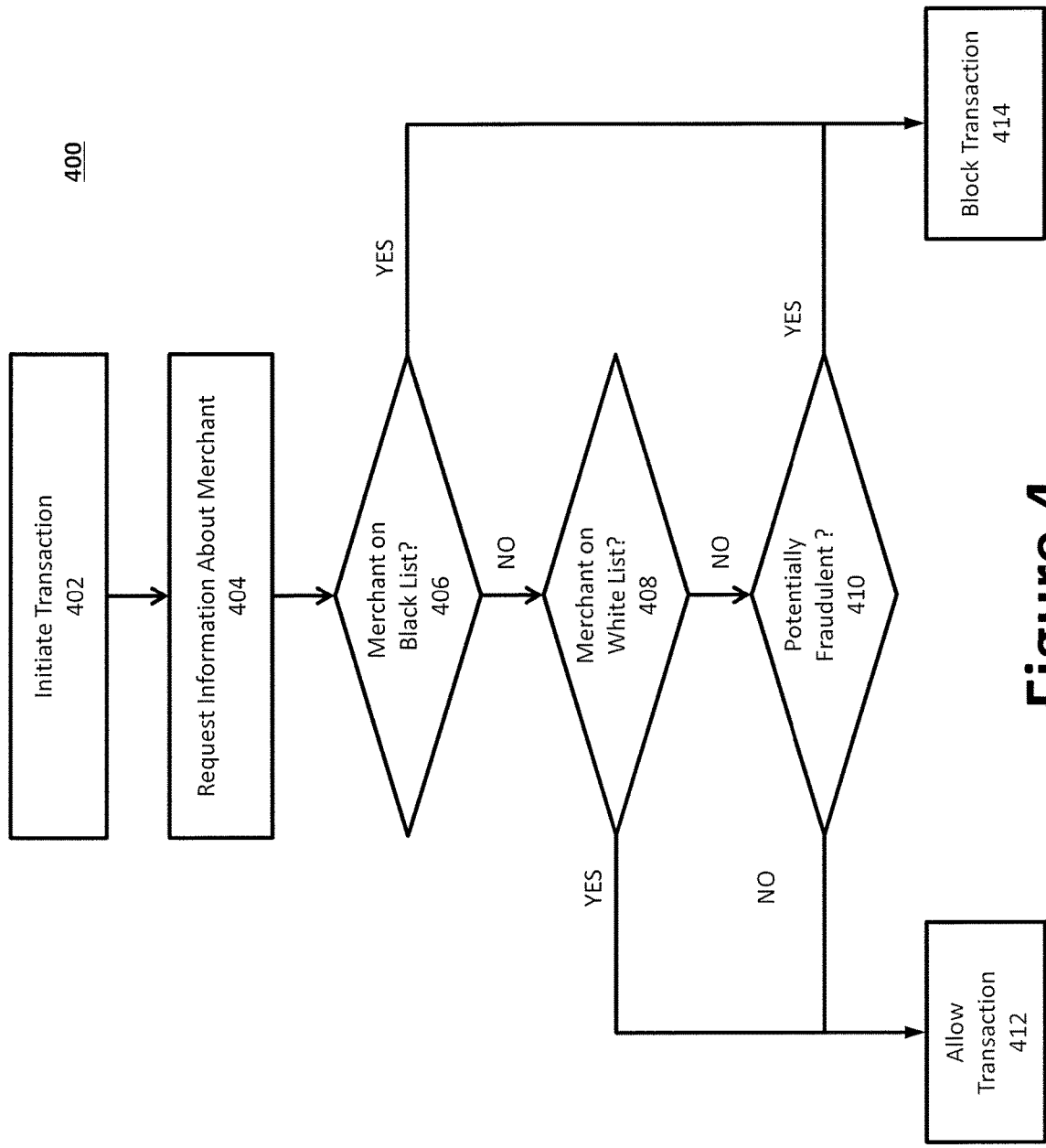
FIG. 4 is a flow chart of an example Shared Merchant Module process.

FIG. 4 illustrates an example flowchart 400 of a transaction authentication method that uses user data from a social media network, or other trusted data source, to determine and authorize/deny transactions based on the end-user's preferred merchants. The preferred merchants may be used to generate black and/or white lists. As illustrated, an end-user may initiate a transaction with a merchant at Step 402. The Shared Merchant Module 302a receives the transaction request from the merchant, which contains transaction data, such as merchant location, merchant name, type of goods, transaction amount, end-user account information, end-user name, etc. At Step 404, the Shared Merchant Module 302a may query the end-user's social media network profile for any information associated with the merchant. At Step 406, the Shared Merchant Module 302a determines whether the merchant is listed on the end-user's black list. If the merchant is listed on the black list, the transaction is blocked at Step 414.

If the merchant is not on the black list, the Shared Merchant Module 302a proceeds to the next Step. At Step 408, the Shared Merchant Module 302a determines whether the merchant is listed on the end-user's white list. If the merchant is listed on the white list, the transaction is allowed at Step 412. If the merchant is not on the white list, the Shared Merchant Module 302a proceeds to the next Step. At Step 410, the Shared Merchant Module 302a determines whether the transaction is potentially fraudulent based on other data. For example, other modules within the Social Network Module 302 may be employed, such as the Shared Location Module 302b, Shared Behavior Module 302c and Shared Calendar Module 302d. Alternatively, if the Social Network Module 302 is unable to provide sufficient data for a particular transition, the Heuristics Module 304 or Miscellaneous Module 306 may be employed to determine whether the transaction is potentially fraudulent. If the transaction is flagged as potentially fraudulent at 414, the transaction is either blocked (e.g., a denial flag is generated by one or more computers) or forwarded to another module or system for automated or manual review. If the transaction is ultimately not flagged as potentially fraudulent, the transaction is flagged as allowable at Step 412 (e.g., an authorization flag is generated).

For example, if an end-user Likes the merchant "Louis Vuitton" on the end-user's social media network, Louis Vuitton may be added to the white list and the financial institution need not flag a transaction at Louis Vuitton as fraud. Conversely, if an end-user Dislikes the merchant "Ducci" (e.g., is boycotting that merchant via the end-user's social media network), Ducci may be added to the black list and the financial institution may flag a transaction at Ducci as fraud. Using this example, an authorization flag may be generated by one or more computers in the Transaction Authorization System 104 when a transaction occurs at Louis Vuitton and, a denial flag is generated when a transaction occurs at Ducci. The one or more computers may communicate (i) the generated denial flag and/or (ii) the generated authorization flag to a financial institution's server over a communication network, whereby the financial transaction is authorized when the generated authorization flag is communicated by one or more computers.

As will be appreciated, for the purposes for this application, the various white lists and black lists may be manually established by the end-user and saved to a trusted data source associated with end-user's account. For example, the end-user may provide to the Transaction Authorization System 104 lists of approved activities (white list), blocked activities (black list), and/or other purchase parameters to be used in connection with transaction authentication. In another example, the end-user may indicate that the credit card cannot be used at automatic teller machines (ATM). The methodology may similarly be used to restrict, or prohibit, internet purchases (e.g., online shopping).

Figure 5:
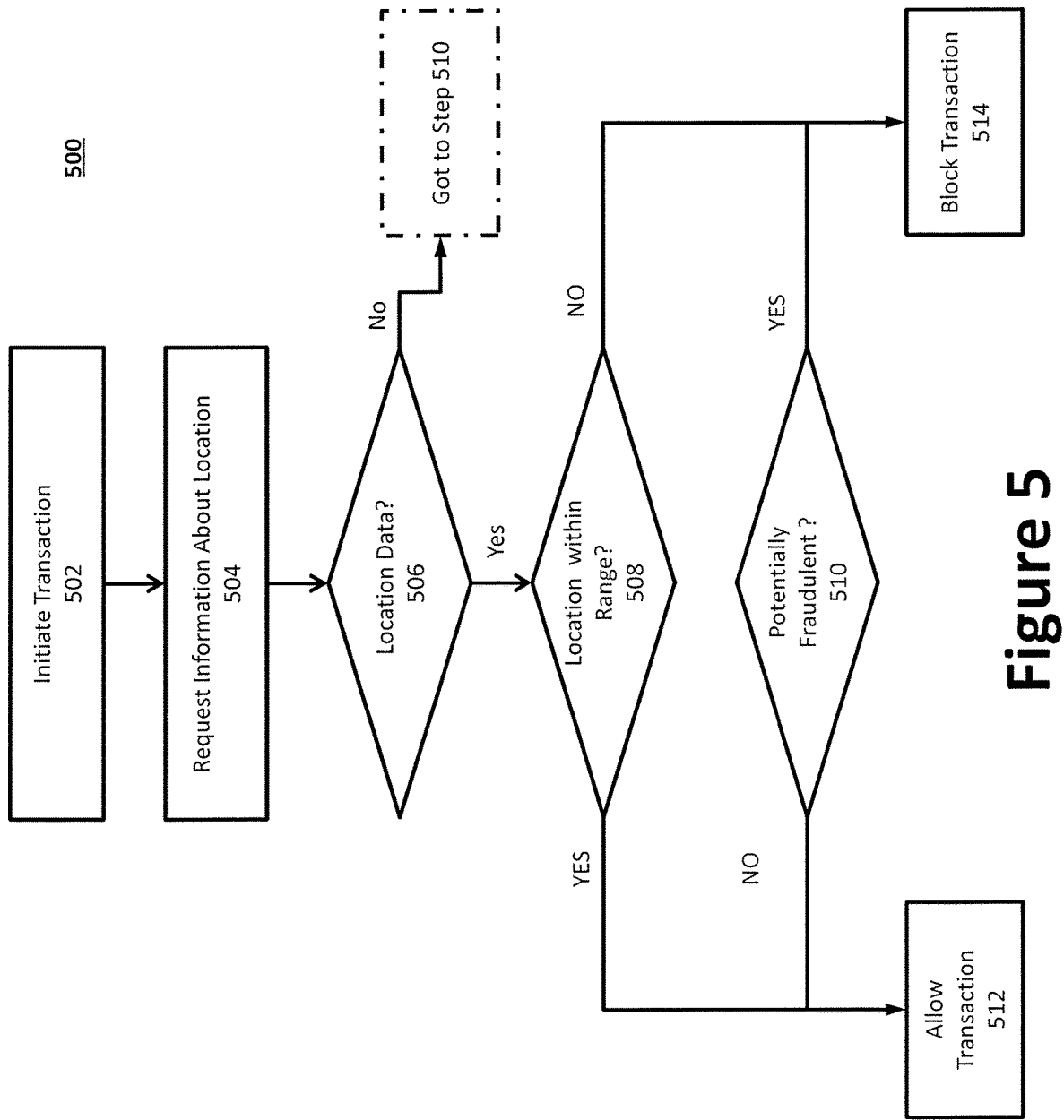
FIG. 5 is a flow chart of an example Shared Location Module process.

FIG. 5 illustrates an example flowchart 500 of a transaction authentication method that uses user data from a social media network, or other trusted data source, to determine and authorize/deny transactions based on user data representing the end-user's past, present, or future location. Thus, the user data may comprise data relating to one or more locations. One or more locations may be flagged as approved (white list) or blocked (black list) depending on the distance between the user data location and merchant location identified in, for example, the transaction data. Accordingly, a financial transaction may be authorized if a location is flagged as approved (e.g., within a predetermined distance of the merchant location) and denied if the location is flagged as denied (e.g., outside of a predetermined distance of the merchant location). As illustrated, an end-user may initiate a transaction with a merchant at Step 502. The Shared Location Module 302b receives the transaction request from the merchant, which contains transaction data, such as merchant location, merchant name, type of goods, transaction amount, end-user account information, and end-user name, among other things.

At Step 504, the Shared Location Module 302b may query the end-user's social media network profile for any information associated with the end-user's location (e.g., present location or recent location where the location could be in the future or past based on a scheduled event). At Step 506, the Shared Location Module 302b determines whether the location data exists for the end-user. Location data may be created in a number of ways. For example, when an end-user Checks-In to a venue using a social media network, location data associated with the Check-In may be gathered as related with the user as a present or past location. In certain situations, as discussed below, future locations may also be identified or anticipated using calendar data, wall posts, statuses, etc. While a Check-In may be manually executed, automatic Check-Ins are also contemplated. For example, the location may be shared automatically (whether with a Social Media Network or with the Transaction Authorization System 104) using, for example, the Computer Terminal 108 and/or Portable Terminal 112's GPS coordinates (via a GPS transceiver) and/or IP address.

Generally speaking, the location data may be determined using, for example, (i) known longitudinal/latitudinal coordinates for the particular venue/merchant, (ii) GPS coordinates using a GPS receiver, and/or (iii) an input from the user. For example, when an end-user Checks-In at the Olive Garden, the social media network may query a look-up table to determine the location of the Olive Garden. In another alternative, a portable device's internal GPS receiver (or via other triangulation method) may provide the end-user's GPS coordinate at the time of Check-In. In yet another alternative, the end-user may be prompted, or otherwise solicited, to provide the location. In fact, the social media network may employ multiple methods. For example, the end-user may indicate that he or she is at the Olive Garden. If there are multiple Olive Gardens, the social media network may provide multiple options for specific Olive Gardens or query the end-user for the location. Alternatively, the social media network may use a look-up table to identify the exact addresses for the multiple Olive Gardens. The addresses may be coupled with GPS coordinates, which may be used to automatically identify the closest Olive Garden to the end-user's present GPS coordinate (e.g., using a mobile device's GPS transceiver), thereby further increasing accuracy. In certain aspects, location may be determined using a third-party person Check-In. For example, if a friend Checks-In the end-user as being at a particular location, that location may be used as the end-user's location, even though he or she did not personally Check-In. Accordingly, the end-user may identify one or more "trusted" friends to ensure that all Check-Ins may be used by a bank as a trusted source.

The location, or data representing a location, may further include time-stamp information indicating when an end-user was at said location. Accordingly, a transaction authorization system may refer to the time stamp information to determine the reliability of location data. Moreover, the transaction authorization system may be configured to only trust (e.g., consider) location data having a time stamp within a predetermined period of time. Thus, in certain aspects, it may be possible for the location to expire (e.g., no longer trusted) after a configurable amount of time. Similarly, location data time stamps may be further used to identify fraud. For example, if the transaction authorization system determines that the end-user is in Chicago, Ill., at 1:00 pm CST, and then makes a purchase in Berlin, Germany, at 2:00 pm CST, the transaction authorization system may conclude that it would not be possible to travel that distance in one hour, thereby denying the transaction. Such time/place correlation methodology may also be employed to verify the accuracy of received location data. For example, if the end-user resides in Chicago, Ill., makes a purchase in Chicago, Ill., but "Checks-In" one hour later in London (e.g., via a social media network), the transaction authorization system may be configured to distrust location data retrieved from that data source until, for example, the user re-confirms the accuracy of the source, thereby indicating that the account has not been compromised.

If location data for the end-user exists, the Shared Location Module 302b proceeds to Step 508. If location data for the end-user does not exist, the Shared Location Module 302b proceeds to Step 510. At Step 508, the Shared Location Module 302b determines whether the location data for the end-user matches the transaction location. The Shared Location Module 302b need not require exact matches. Accordingly, the Shared Location Module 302b may determine whether the transaction location is within a predetermined distance of the location data for the end-user. The predetermined distance (e.g., a radius around a location) may be established when the end-user initially sets up an account with the Enhanced Transaction Authorization System 100 and may be updated or edited by the end-user or financial institution as needed. Thus, a financial institution may set the predetermined distance or may allow the end-user to set the predetermined distance. For example, when the end-user opens an account, the financial institution may query the end-user for a preferred predetermined distance. A similar method may be applied to virtual locations. For example, when an end-user signs in to Amazon®, the end-user may share that they are shopping on Amazon® with a social media network. A financial institution may then confirm with user data received from the social media network that the merchants are a match.

In operation, the Shared Location Module 302*b* may find a match when the two locations are within the same city, state, country, or within a predetermined distance of each other (e.g., x miles). If the transaction location is within a predetermined distance of the location data for the end-user, the transaction is allowed at Step 512. If the transaction location is not within a predetermined distance of the location data for the end-user at Step 514, the transaction is either blocked (e.g., a denial flag is generated by one or more computers) or forwarded to another module or system for automated or manual review. For example, if an end-user travels from Chicago to Rome on vacation, an end-user may pre-authorize and transactions that occur in the Rome, or even Italy. Another example could be that an end-user Checks-In to a merchant such as a restaurant and the transaction provider just needs to check for the name of the merchant and vendor to match. It may be reasonable to set distance tolerance levels such that any transaction within an x-mile radius from the location provided by the user via the social media network would also be allowed. The end-user location may also be provided with configurable timeout. In other words, the location is trusted for a predetermined number of hours (e.g., 12-24 hours) before it is no longer valid as a point of authentication.

At Step 510, the Shared Location Module 302*b* determines whether the transaction is potentially fraudulent based on other data. For example, other modules within the Social Network Module 302 may be employed, such as the Share Merchant Module 302*a*, Shared Behavior Module 302*c* and Shared Calendar Module 302*d*. Alternatively, if the Social Network Module 302 is unable to provide sufficient data for a particular transaction, the Heuristics Module 304 or Miscellaneous Module 306 may be employed to determine whether the transaction is potentially fraudulent. If the transaction is flagged as potentially fraudulent, the transaction is either blocked (e.g., a denial flag is generated by one or more computers) or forwarded to another module or system for automated or manual review at Step 514. If the transaction is not flagged as potentially fraudulent, the transaction is allowed at Step 512 (e.g., an authorization flag is generated).

Figure 6:
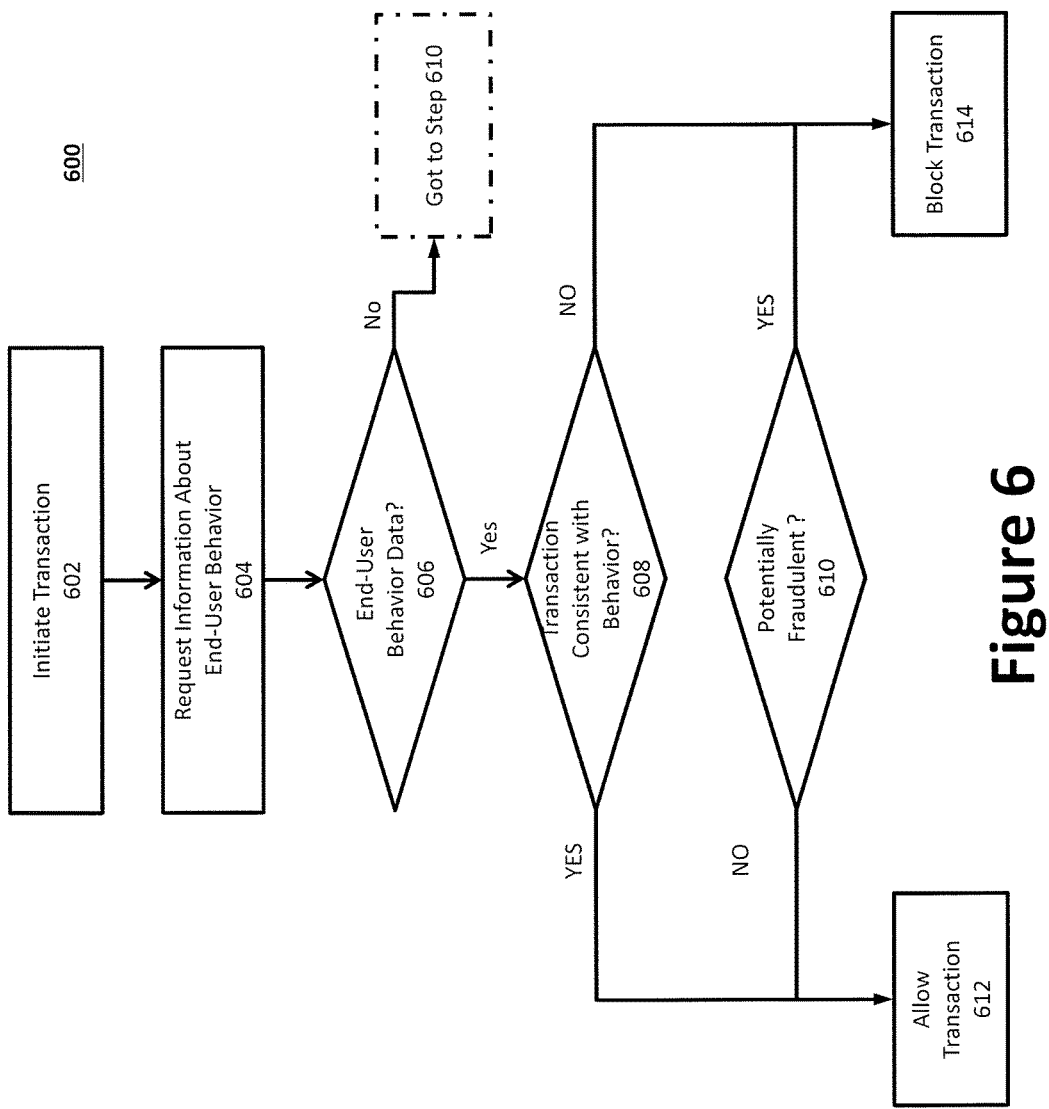
FIG. 6 is a flow chart of an example Shared Behavior Module process.

FIG. 6 illustrates an example flowchart 600 of a transaction authentication method that uses user data from a social media network, or other trusted data source, to determine and authorize/deny transactions based on the end-user's behavior data. Behavior data may include data related to, for example, affinity for sports, fine dining, or drinking. Indeed, behavior data may include forbidden spending categories, such an aversion to alcohol, strip clubs, etc. Accordingly, behavior data may be used to determine whether a transaction is consistent with the end-user's lifestyle by flagging transactions as fraudulent when they relate to forbidden spending categories and/or allowing transactions to which the users have expressed an affinity. Thus, the user data may comprise data relating to one or more behavior categories. The one or more behavior categories may be flagged as approved (white list) or blocked (black list). Accordingly, a financial transaction may be authorized if a behavior category is flagged as approved and denied if the behavior category is flagged as blocked.

As illustrated, an end-user may initiate a transaction with a merchant at Step 602. The Shared Behavior Module 302*c* receives the transaction request from the merchant, which contains transaction data, such as merchant location, merchant name, type of goods, transaction amount, end-user account information, and end-user name, among other things.

At Step 604, the Shared Behavior Module 302*c* may query the end-user's social media network profile for any information associated with the end-user's interests and behavior (e.g., interest in skiing, fine dining, soccer, etc.). At Step 606, the Shared Behavior Module 302*c* determines whether the behavior data exists for the end-user. If behavior data for the end-user exists, the Shared Behavior Module 302*c* proceeds to Step 608. If behavior data for the end-user does not exist, the Shared Behavior Module 302*c* proceeds to Step 610.

At Step 608, the Shared Behavior Module 302*c* determines whether the behavior data for the end-user is consistent with the transaction. For example, if the transaction is for soccer equipment and the behavior data for the end-user indicates that the user plays soccer, the transaction may be approved. As with the other modules, the Shared Behavior Module 302*c* need not require exact matches. Accordingly, the Shared Behavior Module 302*c* may determine whether the transaction location is in the same field or category. For example, any sports-related purchase may be authorized based on the end-user's interest in soccer. If the behavior data for the end-user is consistent with the transaction, the transaction is allowed at Step 612. If the behavior data for the end-user is inconsistent with the transaction, the transaction is either blocked (e.g., a denial flag is generated by one or more computers) or forwarded to another module or system for automated or manual review at Step 614.

At Step 610, the Shared Behavior Module 302*c* determines whether the transaction is potentially fraudulent based on other data. For example, other modules within the Social Network Module 302 may be employed, such as the Shared Merchant Module 302*a*, Shared Location Module 302*c*, and Shared Calendar Module 302*d*. Alternatively, if the Social Network Module 302 is unable to provide sufficient data for a particular transition, the Heuristics Module 304 or Miscellaneous Module 306 may be employed to determine whether the transaction is potentially fraudulent. If the transaction is flagged as potentially fraudulent, the transaction is either blocked (e.g., a denial flag is generated by one or more computers) or forwarded to another module or system for automated or manual review at Step 614. If the transaction is not flagged as potentially fraudulent, the transaction is allowed at Step 612. For example, if the end-user shares behavior data indicating that the end-user has joined a bowling or softball league, the Shared Behavior Module 302*c* may be configured to anticipate that the end-user will spend an amount of money at, for example, a sporting goods merchant in the near future. Shared behavior may be configured by the financial institution, or end-user, to set allowed behaviors like a camping trip as valid reasons to spend unusual amounts of money.

Figure 7:
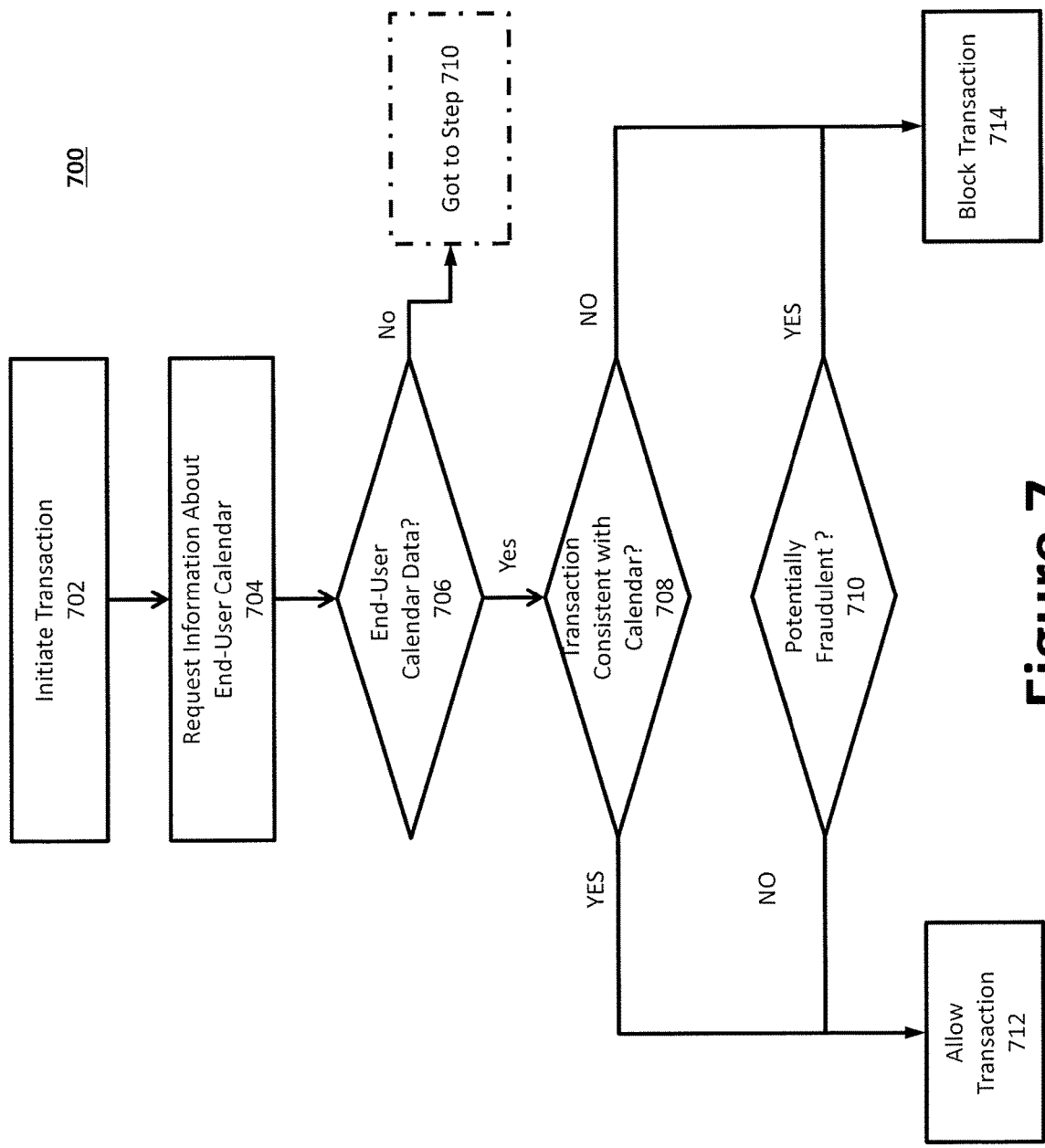
FIG. 7 is a flow chart of an example Shared Calendar Module process.

FIG. 7 illustrates an example flowchart 700 of a transaction authentication method that uses user data from a social media network, or other trusted data source, to determine and authorize/deny transactions based on the end-user's calendar data. Calendar data may include data related to, for example, upcoming trips, vacations, meetings, concerts, dining, location, or parties. As illustrated, an end-user may initiate a transaction with a merchant at Step 702. The Shared Calendar Module 302d receives the transaction request from the merchant, which contains transaction data, such as merchant location, merchant name, type of goods, transaction amount, end-user account information, and end-user name, among other things.

At Step 704, the Shared Calendar Module 302d may query the end-user's social media network profile or other calendar (e.g., a personal/business calendar, such as Microsoft Outlook®) for any information associated with the end-user's upcoming events. At Step 706, the Shared Calendar Module 302d determines whether the calendar data exists for the end-user. If calendar data for the end-user exists, the Shared Calendar Module 302d proceeds to Step 708. If calendar data for the end-user does not exist, the Shared Calendar Module 302d proceeds to Step 710.

At Step 708, the Shared Calendar Module 302d determines whether the calendar data for the end-user is consistent with the transaction. For example, if the transaction is for wedding supplies and the calendar data for the end-user indicates that the end-user is planning to get married in the near future, the transaction may be approved. As with the other modules, the Shared Calendar Module 302d need not require exact matches. Accordingly, the Shared Calendar Module 302d may determine whether the transaction location is in the same field or category. For example, any flower/venue rental-related purchases may be authorized based on the end-user's upcoming wedding. If the calendar data for the end-user is consistent with the transaction, the transaction may be allowed at Step 712. If the calendar data for the end-user is inconsistent with the transaction, the transaction is either blocked (e.g., a denial flag is generated by one or more computers) or forwarded to another module or system for automated or manual review at Step 714.

At Step 710, the Shared Calendar Module 302d determines whether the transaction is potentially fraudulent based on other data. For example, other modules within the Social Network Module 302 may be employed, such as the Shared Merchant Module 302a, Shared Location Module 302b, and Shared Behavior Module 302c. Alternatively, if the Social Network Module 302 is unable to provide sufficient data for a particular transaction, the Heuristics Module 304 or Miscellaneous Module 306 may be employed to determine whether the transaction is potentially fraudulent. If the transaction is flagged as potentially fraudulent, the transaction is either blocked (e.g., a denial flag is generated by one or more computers) or forwarded to another module or system for automated or manual review at Step 714. If the transaction is not flagged as potentially fraudulent, the transaction is allowed at Step 712. For example, if the end-user shares calendar data indicating that the user is planning a trip to Las Vegas, the Shared Behavior Module 302c may be configured to anticipate that the end-user will spend money in Las Vegas on, for example, hotels, gambling, and/or fine dining. Shared Calendar Module 302d may be configured by the financial institution, or end-user, to set allowed expenses related to upcoming calendar events.

Figure 8:
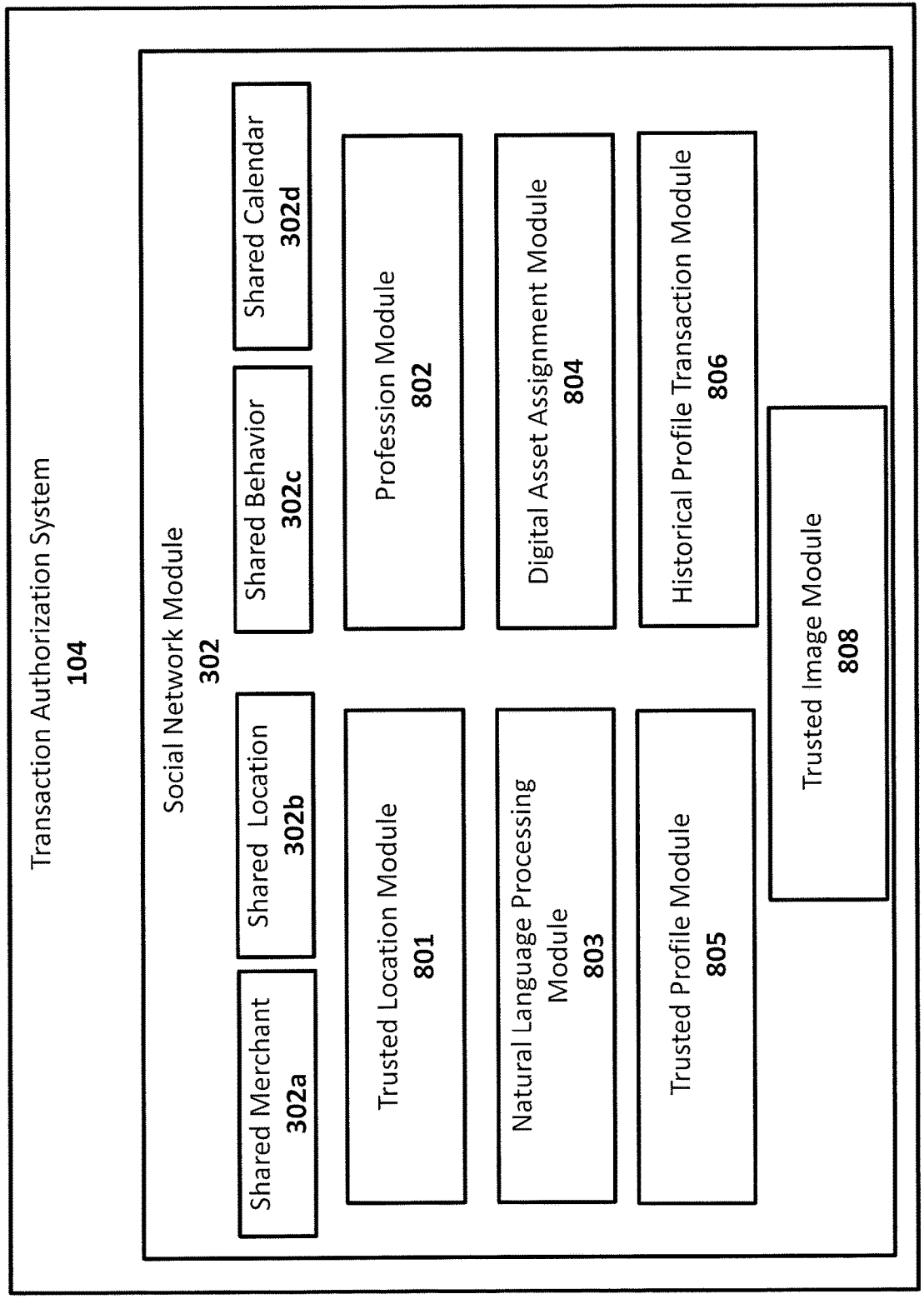
FIG. 8 is a block diagram illustrating another example architecture for a Transaction Authorization Module.

Turning to FIG. 8, while the behavior of an end-user may be used to identify potential fraud, other social attributes may be used to increase the quality or trustworthiness of an end-user's social media account or profile. That is, a Transaction Authorization System 104 may comprise, in addition to, or in lieu of, the other modules: a Trusted Location Module 801; a Profession Module 802; a Natural Language Processing Module 803; a Digital Asset Assignment Module 804; a Trusted Profile Module 805; Historical Profile Transaction Module 806; and/or Trusted Image Module 808, each of which may be stored to a trusted data source and are described in greater detail below.

Trusted Location Module 801.

Figure 10:
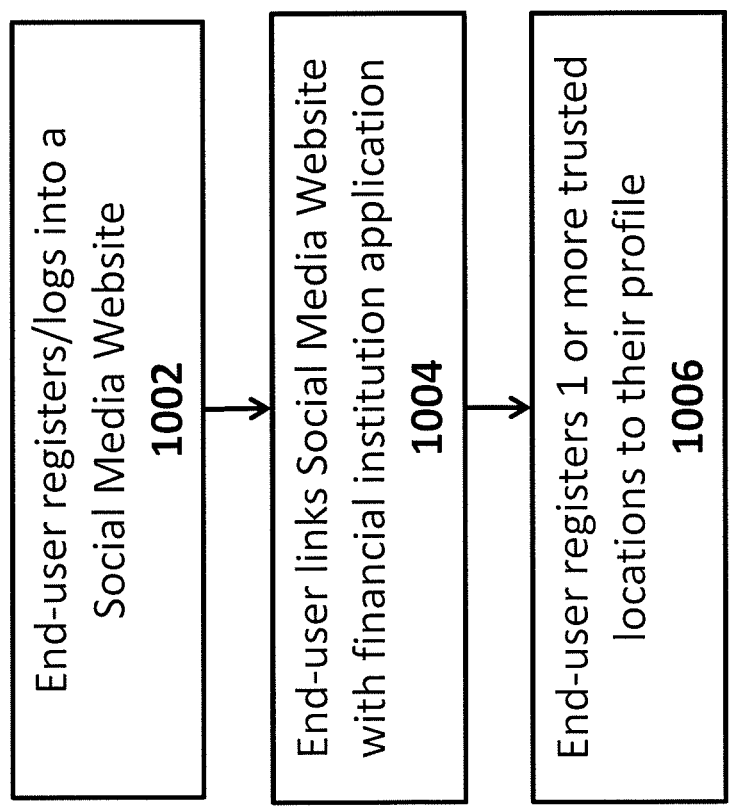
FIG. 10 is a flowchart diagram illustrating an example method of established trusted locations.

Using the Trusted Location Module 801, a financial transaction may be evaluated for potential fraud by comparing the shared location of an end-user against one or more predetermined trusted locations stored to a trusted location database. Each end-user may be enabled to update and customize the trusted location database through a user-interface or portal (e.g., via a website or through a mobile application). Indeed, FIG. 10 is a flowchart diagram 100 illustrating an example method of linking one or more financial accounts (e.g., credit cards) with one or more third-party websites (e.g., social media networks) and identifying one or more predetermined trusted locations to facilitate communication of user data. At Step 1002, the end-user may log into, or otherwise gain access to, a social media network using the end-user's credentials (e.g., a username and password). If the end-user is not yet registered to use the social media network, the end-user may be required to first create an account with the social media network. As described with reference to FIG. 2, the end-user may link the end-user's social media network profile with that end-user's financial institution at Step 1004. However, the end-user may further designate, register, or otherwise link one or more trusted locations with their profile at Step 1006.

For example, an end-user may indicate that an address (e.g., a home address) is to be considered a trusted location regardless of time/date of the transaction. Alternatively, the end-user may indicate that a first address is to be considered trusted at a particular date/time, while a second address is to be considered trusted at a different date/time. For example, the user may indicate that his work address is to be trusted during working hours (e.g., 9:00 am to 5:00 pm), while the end-user's home address is to be trusted during the remaining hours (e.g., 5:01 pm to 8:59 am). Likewise, that end-user may indicate that a summer home address is to be trusted during summer months (e.g. May to August); while a primary residence is to be trusted during the remaining months.

In operation, the Trusted Location Module 801 may be used by a merchant to determine whether a transaction initiated online is valid (e.g., through a website) based on the location of the user at or near the time of the transaction. The location of the user may be determined using a portable device and GPS transceiver/receiver (or other location tracking methods, such as triangulation using cellular towers) or the end-user may manually input location coordinates by for example providing cross streets, points of interests, or named locations such as "Sears Tower Office Building". Indeed, it is common for most online purchases to occur at trusted locations, such as, for example, the end-user's home, work, or a family member's home. Accordingly, if an end-user initiates a transaction through Amazon.com and shares his or her location at some configurable time from the transaction's occurrence, the Trusted Location Module 801 may then receive the location data from a third-party source via a network or antennae and compare the end-user's shared location to the trusted location stored in the Trusted location Database to determine if the locations match.

The shared location may be the end-user's location at the time of the transaction, or within a predetermined time period before, or even after the time of the transaction. That is, the system may provide for a location sharing window (e.g., 30 minutes before or after the transaction) for the end-user to share the current location. For example, the end-user may initiate, or even complete, an online transaction while commuting home. Once home, the user may share his current location within the location sharing window to authenticate the purchase. Similarly, the Trusted Location Module 801 may be configured to authorize transactions if initiated, or concluding, within a predetermined distance of a trusted location. For example, if the end-user initiates a transaction from his home, but does not complete the transaction until arriving at the bus stop, a merchant or financial institution, using the Trusted Location Module 801, can calculate the distance between the shared location and a trusted location. If end-user's shared location is within a predetermined distance of a trusted location, then the transaction is considered not fraudulent (e.g., authorized) because, for the transaction to be fraudulent, the fraudster would need to be physically present at one of the pre-registered trusted locations in a trusted location Database at the time of the fraudulent transaction. Further, in certain aspects, such as mail order and online shopping, the transaction may be authorized if the shipping location matches a trusted location.

Figure 11:
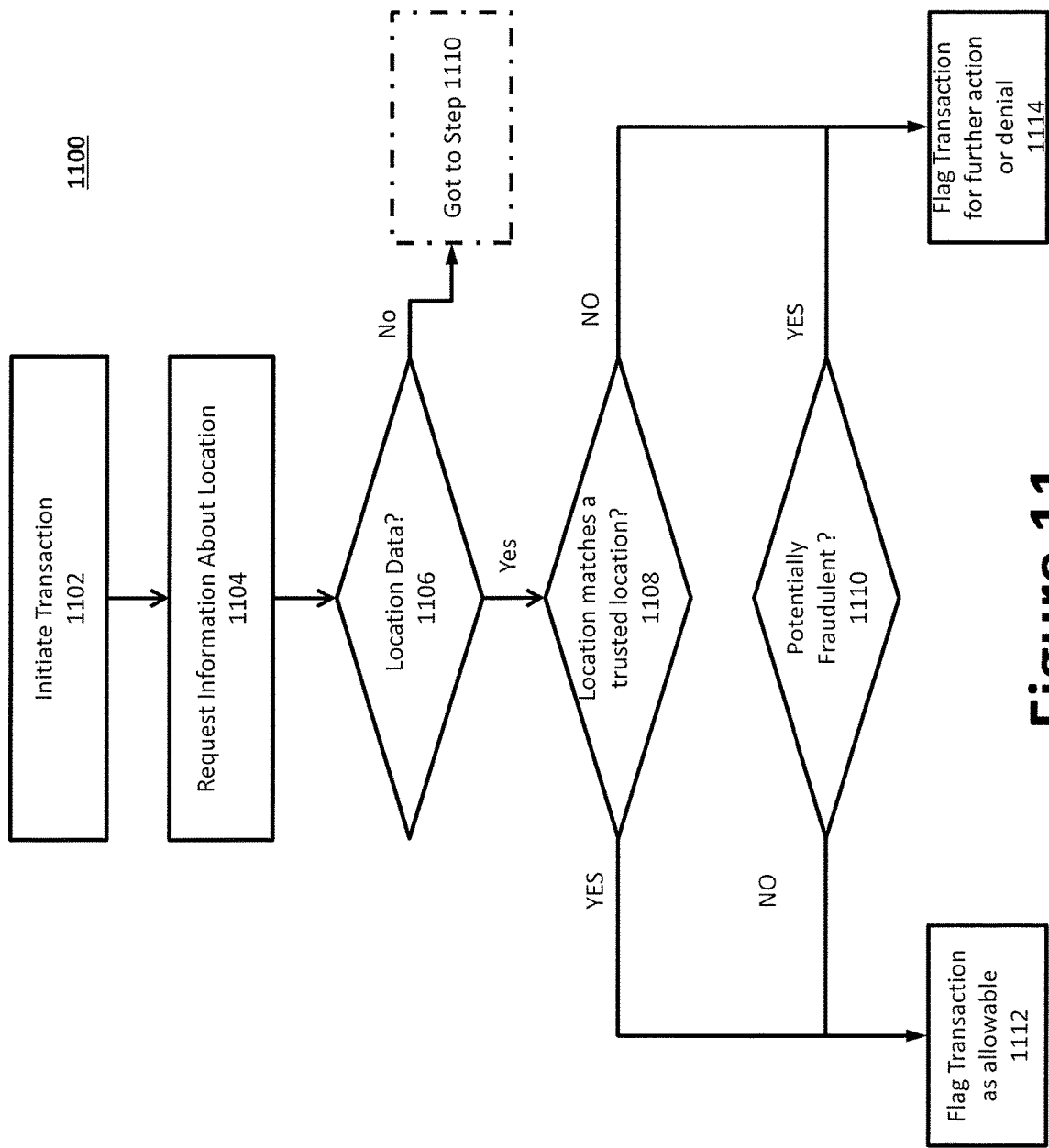
FIG. 11 is a flow chart of an example Trusted Location Module process.

For example, as illustrated by the steps in the flowchart 1100 in FIG. 11 a transaction may be authorized based on a trusted location. At Step 1102, a transaction may be initiated online. At Step 1104, the end-user's current (or recent) location may be requested. If no location data is available within a predetermined period of time, the transaction is determined to be potentially fraudulent at Step 1110. At Step 1110, the Trusted Location Module 801 determines whether the transaction is potentially fraudulent based on other data, for example, other modules within the Transaction Authorization System 104. Alternatively, if the Transaction Authorization System 104 is unable to provide sufficient data for a particular transition, a Heuristics Module 304 or Miscellaneous Module 306 may be employed to determine whether the transaction is potentially fraudulent. However, if location data is available, the end-user's location is compared to one or more predetermined trusted locations stored to a trusted location database at Step 1108. If the transaction is ultimately flagged as potentially fraudulent, the transaction is either blocked (e.g., a denial flag is generated by one or more computers) or forwarded to another system for automated or manual review at Step 1114. If the transaction is ultimately not flagged as potentially fraudulent, the transaction is flagged as allowable at Step 1112 (e.g., an authorization flag is generated). The Transaction Authorization System 104 may also dynamically add trusted locations, which may be in real-time. For example, the Transaction Authorization System 104 may determine, in real-time, where the end user works and lives based on the frequency and/or time of the end user's location.

Profession Module 802.

Using the Profession Module 802, a financial transaction may be evaluated for potential fraud by comparing the type of transaction, or type of goods/services purchased, against one or more predetermined trusted profession transaction categories stored to a trusted Profession Transaction database. That is, the Profession Module 802 may be configured to analyze transaction data to determine if the transaction is consistent with a predetermined profession profile associated with the profession of the end-user (e.g., the account holder). For example, if an end-user's profession is identified as a nurse, then the Profession Module 802 would anticipate that the end-user would make purchases related to nursing, such as uniforms, medical equipment, and other nursing supplies. Similarly, if the end-user's profession is identified as a plumber, the Profession Module 802 may be configured to authorize hardware purchases, such as plumbing tools and supplies. Accordingly, each end-user may be enabled to update and customize the trusted profession transaction database through a user-interface or portal. For example, an end-user may indicate that he is a patent attorney, but moonlights on weekends as a plumber. Accordingly, the Profession Module 802 would anticipate, and thus authorized purchases related to United States Patent and Trademark Office ("USPTO") fees and hardware.

In operation, once a predetermined profession profile for an end-user has been identified, the Profession Module 802 may compare transaction data against data associated with the profession profile. Additionally, the Profession Module 802 may also be configured to retrieved and analyze information about the employer of the end-user. For example, if it is determined that the end-user is a Patent Examiner and works for the USPTO in Alexandria, Va., it is reasonable to assume that most of the end-user's financial transactions will occur within predetermined distance of the USPTO's office (i.e., Alexandria, Va.). Applying this logic one Step further, if the end-user terminates employment with the USPTO and pursues a new job at Google® in Mountain View, Calif., then the Profession Module 802 would anticipate that the end-user would be purchasing, among other things associated with a move, plane tickets, moving equipment, and new furniture. The Profession Module 802 would also update the Transaction Authorization System 104 to anticipate future purchases to occur near Mountain View, Calif., rather than Alexandria, Va.

Figure 12:
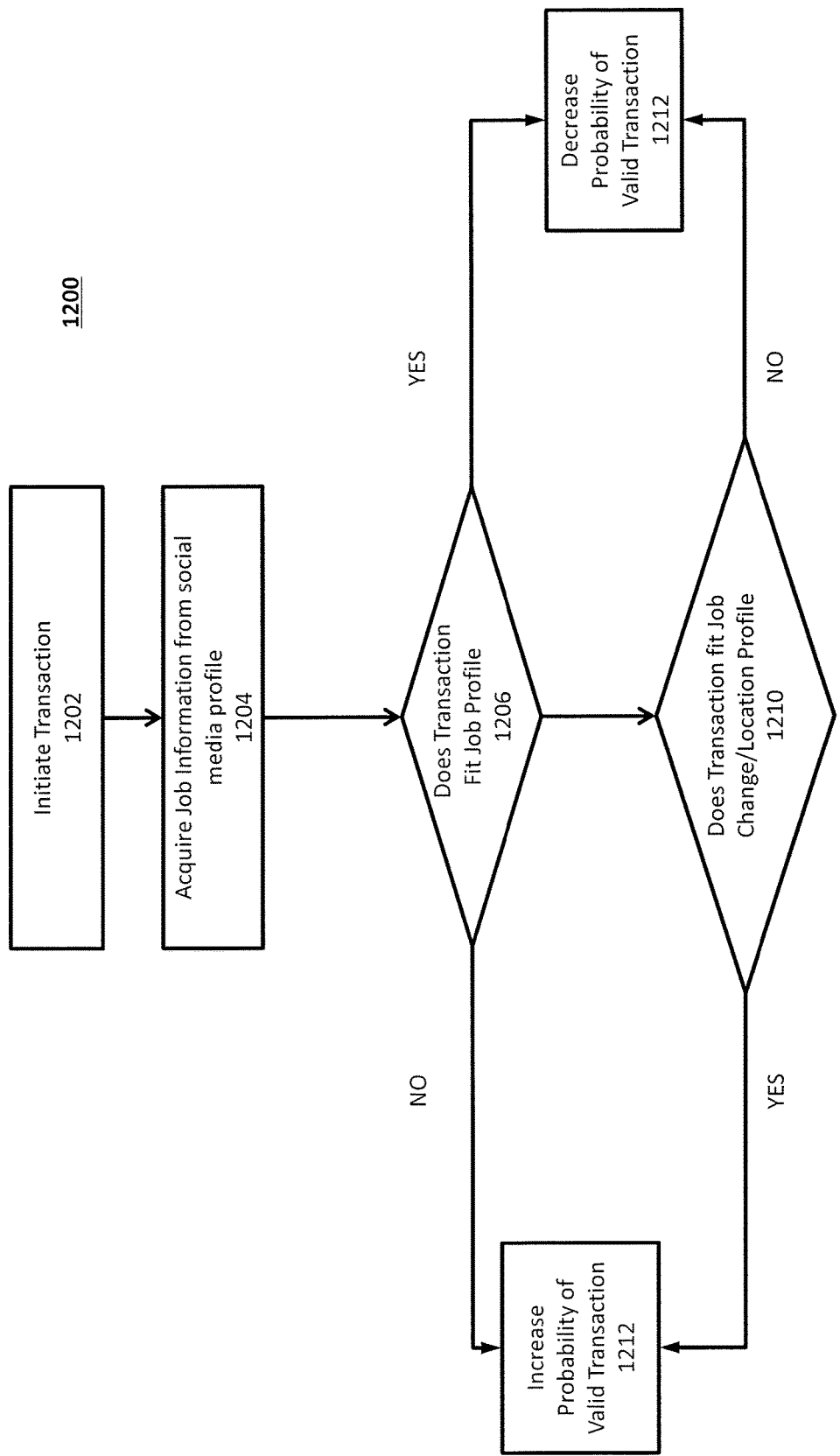
FIG. 12 is a flow chart of an example Profession Module process.

For example, as illustrated by the steps in the flowchart 1200 in FIG. 12, a transaction may be authorized based on user-profession data. At Step 1202, a transaction may be initiated. At Step 1204, the end-user's employment information is retrieved from social media network profile. However, if employment information data is available, the transaction data may be compared to one or more predetermined trusted profession transaction categories stored to a trusted profession transaction database at Step 1206. If the transaction data matches a trusted profession transaction category based on one or more criteria, the probability of valid transaction is increased at Step 1212. If the transaction data does not match a trusted profession transaction category based on one or more criteria, the probability of valid transaction is decreased at Step 1214. If the end-user has recently changed employment, the transaction data may be further compared at Step 1210 to one or more predetermined trusted profession transaction categories associated with the new employment, which may also be stored to a trusted profession transaction database. If the transaction data matches a new trusted profession transaction category based on one or more criteria, the probability of valid transaction is increased at Step 1212. If the transaction data does not match a new trusted profession transaction category based on one or more criteria, the probability of valid transaction is decreased at Step 1214. Once the probability of a valid transaction has reached a predetermined threshold, based on, for example, match percent, the transaction may be allowed (e.g., an authorization flag is generated). Conversely, once the probability of an invalid transaction has reached a predetermined threshold, based on, for example, mismatch percent, the transaction may be blocked (e.g., a denial flag is generated by one or more computers) or transmitted to another system or human operator for further review. Alternatively, the probability of a valid or invalid transaction may be used to simply further authenticate the results generated by one or more other modules.

In certain aspects, the Profession Module 802 may be used to facilitate corporate card management. That is, the Profession Module 802 may monitor the transactions associated with a corporate cards issued by a company to an end-user whereby only certain transactions are authorized. For example, the Profession Module 802 may be configured authorize lunches and dinners for client entertainment, but to reject transaction as electronic stores. The employer may similarly employ other purchase parameters as set forth herein, including, for example, transaction limits, restriction to certain locations, date/time limitations, etc.

Natural Language Processing Module 803.

In some instances, the data used to evaluate a financial transaction to for potential fraud cannot be explicitly transmitted or retrieved from a third-party source. For example, it is possible that an end-user has not updated the attribute for relationship status in their social media profile but has provided Posts in the form of natural language that would indicate a change in relationship status. For example an end-user might share a Post in the end-user's natural language, which reads, "I'm getting engaged! So happy!" which would then be processed to explicitly determine that the end-user's relationship status is "Engaged." As used herein, the term "natural language" includes any language used by the end-user to communicate with another person, through, for example, a social media network. Thus, through the Natural Language Processing Module 803, any data input that may be desired as an input to another module of the Transaction Authorization System 104 need not be explicitly provided by the user as a key value pair (e.g., a specific data field, such as those directed to gender, age, relationship status, likes, dislikes, etc.), rather, the data may be inferred and extracted using natural language techniques against data collected from a user's third-party data source (e.g., a social media profile).

Figure 13:
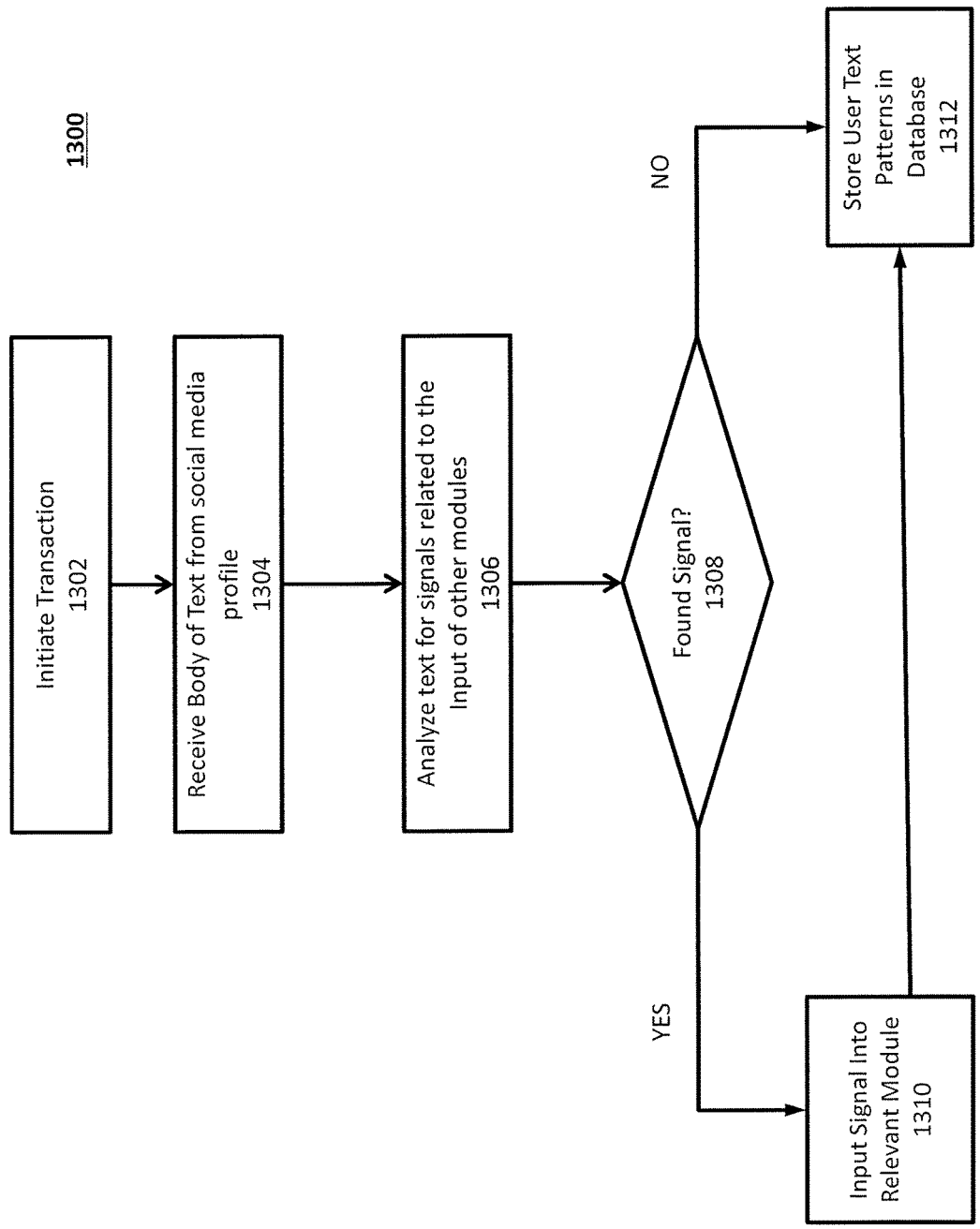
FIG. 13 is a flow chart of an example Natural Language Processing Module process.

Accordingly, using a Natural Language Processing Module 803, a financial transaction may be evaluated for potential fraud by extracting and interpreting Natural Language to generate data that may be transmitted to one or more other modules for processing. For example, as illustrated by the steps in the flowchart in FIG. 13, a transaction may be authorized based on processing retrieved text from a third-party network. At Step 1304, the transaction authorization system would retrieve Posts for an end-user either via a computer network or a database and store it in memory. At Step 1306, the computer system analyzes the body of the Posts and decomposes the Post into Fraud Indication Elements, which may then be transmitted to other modules, such as those described shown in FIG. 8 as inputs. A Fraud Indication Element may be represented using an electronic signal to convey, for example, a flag (e.g., true, false), data value (e.g., real number, percentage, etc.), or the like.

Methods for Natural Language Processing include, but are not limited to, parsing, tokenizing, machine learning, part-of-speech tagging, optical character recognition, sentiment analysis, and topic segmentation among others. At Step 1308, one or more processors determines if a Fraud Indication Element should be transmitted to a relevant coupled module to generate an authorization or transaction denial flag (Step 1310) or stored in a database or coupled memory for later retrieval (Step 1312). Step 1308 can decide if a Fraud Indication Element is relevant based on configurable purchase parameters such as if there is already enough relevant information to transmit to a relevant module or if a relevant module already has the information it needs based on receiving relevant data explicitly.

More particularly, for example, the Transaction Authorization System 104 may retrieve, via communication network 106, a string of text from the third-party non-transitory information storage device. The third-party non-transitory information storage device may be, for example, a non-transitory information storage device associated with a social media website. Continuation with this example, the string of text may be, for example, a status (e.g., "Off to Vegas for the Weekend!"), portions of a profile (e.g., a biography, summary, etc.), or other text from said social media network. The Transaction Authorization System 104 may then extract, via computer 104a, one or more keywords from said string of text. For example, the status "Off to Vegas for the Weekend!" may be parsed into keywords such as "Vegas" and "Weekend," thereby indicating to the Transaction Authorization System 104 that the account holder may be in Vegas (e.g., a location) for the weekend (e.g., a time/duration). Accordingly, during a transaction, the Transaction Authorization System 104 may compare, via computer 104a, the one or more keywords to said transaction data. For example, the transaction data may indicate that the transaction occurred in Las Vegas on Saturday evening. From this data, the Transaction Authorization System 104 may reasonably conclude (e.g., using fuzzy matching or another comparing techniques), via computer 104a, that the locations (or other parameter) are the same (e.g., "Vegas" substantially matches "Las Vegas") and that the date/time are the consistent (e.g., "weekend" comprises "Saturday evening"). In this case, absent additional data (e.g., a particular date or an adjective, such as "next weekend"), the Transaction Authorization System 104 may presume that "weekend" refers to an upcoming weekend. Thus, the Transaction Authorization System 104 may authorize (or, at minimal, not deny) the transaction because at least one of said one or more keywords matches at least a portion of said transaction data.

Digital Asset Assignment Module 804.

Figure 14:
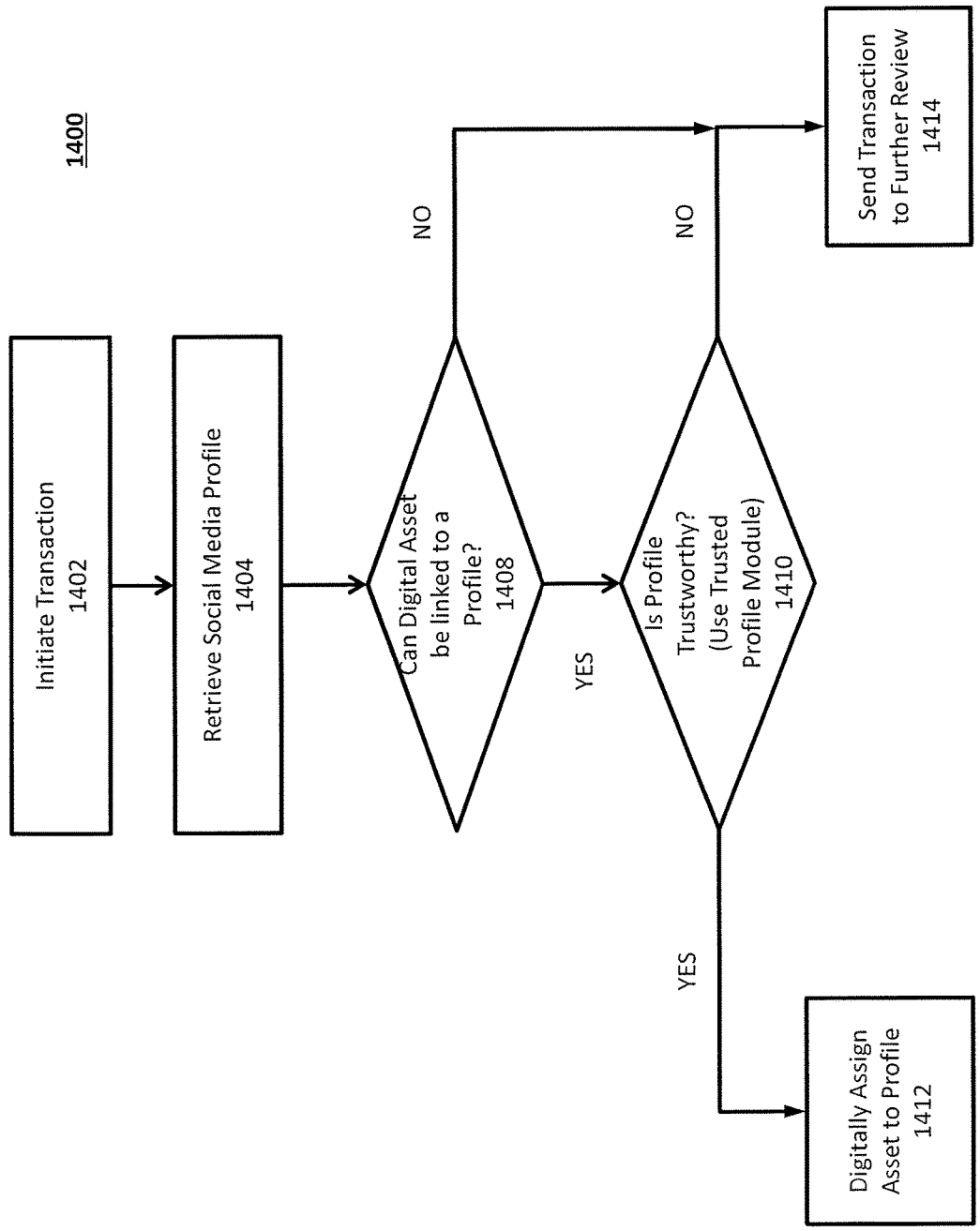
FIG. 14 is a flow chart of an example Digital Asset Assignment Module process.

It is common practice for untrusted individuals to launder money from fraudulent transactions by acquiring digital assets. For example, an untrusted individual may use a stolen credit card to purchase a digital gift card from an online merchant such as Amazon.com, which is then sent to an unverified, untrusted e-mail address for future use. This is a preferred method of fraud because it allows for money acquired in a fraudulent manner to be transformed into a payment source, which appears as if it came from a legitimate source. The Digital Asset Assignment Module 804, which is shown in FIG. 8 and in the flowchart in FIG. 14, describes a method to reduce risk for financial transactions, which involve digital assets. In FIG. 14, Step 1404 acquires a social media network profile for an end-user who is initiating a transaction to acquire a digital asset. The digital asset in the transaction may be for the end-user initiating the transaction or may be for a third party or person. For example if a first end-user wants to buy a second end-user a gift card from Amazon.com, then Step 1408 would inspect a first end-user's and a second end-user's social media network profile to determine if a link may be made from a first end-user's account to a second end-user's account. If it is determined that a second end-user indeed has a social relationship with a first end-user, then the profile information for a first end-user and a second end-user would be transmitted to the Trusted Profile Module 805.

Trusted Profile Module 805.

Using the Trusted Profile Module 805, a financial transaction may be evaluated for potential fraud by evaluating the source of the user data (e.g., the end-user's social media network profile). That is, the Trusted Profile Module 805 determines whether source of the user data, and user data stemming therefore, may be trusted. Once a source of user data is determined to be trustworthy, the source of user data may be stored to a trusted user data source database. Thus, a financial transaction may be further evaluated for potential fraud by initially comparing the source of user data against one or more predetermined user data sources stored to the trusted user data source database.

Figure 9:
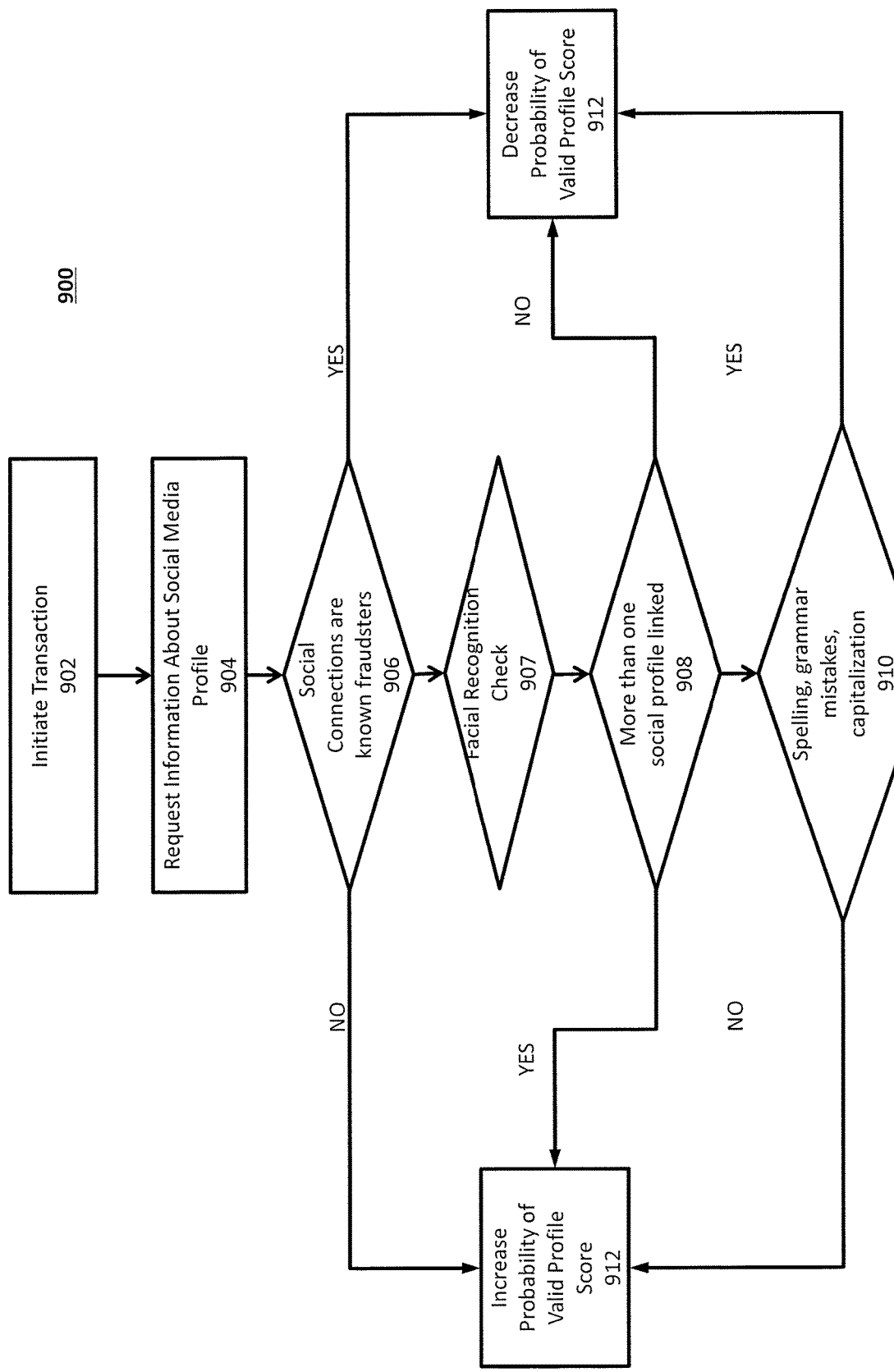
FIG. 9 is a flow chart of an example Trusted Profile Module process.

For example, as illustrated in the flow charts of FIG. 9, at Step 906, a social media account may be verified by inspecting a social media account's network of social connections (e.g., friends, family, acquaintances, etc.). That is, the Transaction Authorization System 104 may deem, through one or more computers, the social media account to be reputable and therefore, user data stemming from (e.g., received from) that social media account may be trusted. For example, untrusted individuals (e.g., criminals and/or fraudsters) may be identified by comparing the names/identities of network of social connections to a database of known untrusted individuals. As a result, untrusted individuals are prohibited from readily facilitating financial transactions by creating fake accounts with plurality fake users as "social connections" in the particular end-user's network.

Furthermore, at Step 907 from the flow chart of FIG. 9, facial recognition processing may be applied to digital images (e.g., photographs, video, etc.) on the end-user's social media account to further determine if a social media network profile may be trusted. Indeed, facial recognition processing functionality may automatically identify, or verify, a person from a photograph or a video frame from a video. While numerous facial recognition processing techniques are possible, one method is to compare selected facial features (e.g., landmarks) extracted from the digital image with one or more digital image stored to a facial database. While the following examples are generally described in terms of photographs, one with skill in the art would understand that the functionality could equally be applied to video (e.g., video frames) and other media. Moreover, depending on available digital image, other possible facial recognition processing techniques would include skin texture analysis and three-dimensional recognition.

For example, if an account has no profile image, or has a profile image that does not contain a face, then the probability that the account is trustworthy diminishes. However, if the profile image contains a face, the identified name/face pair associated with the account may be compared against a database of known name/face pairs to see if the face matches multiple names in the database, which in turn would lower the probability that the social media network profile may be trusted. The identified face could also be compared against a database of known untrusted individuals to determine if a known untrusted individual controls the social media account.

Similarly, other data may be cross referenced between the social media account and end-user data provided during a transaction. For example, in operation, a cross-referencing data module may compare, via a processor, one or more attributes submitted in a transaction (e.g., via online orders, or in person) and then cross reference the one or more attributes with a third-party data source or database, such as a social media website or trusted user data source database. The one or more attributes may include, for example, a phone number, billing address, shipping address, credit card number, Business Identifier Codes ("BIC") number, gender, name, etc. The authenticity of the calculation may be directly corrected to the number of matching items. That is, the more matches, the more authentic a transaction is considered by the Transaction Authorization System 104. Accordingly, the number of matches may be used to calculate a trust score value that indicates the trustworthiness of a transaction. Moreover, different matching data types may be provided different weights by one, for example, importance of the data type. For example, a matching shipping address may be valued at x points; a matching phone number may be valued at y points, etc. The points of each data type may then be summed to arrive at the trust score value for the given transaction. The Transaction Authorization System 104 may then authorize, deny, or request further review of the transaction based upon the trust score value.

Trusted Image Module 808.

A financial transaction may be evaluated for potential fraud using a Trusted Image Module 808. That is, the Trusted Image Module 808 may employ facial recognition to compare a trusted image (e.g., a photograph or video) with an image taken of the user at the time of the transaction. For example, during registration (e.g., as discussed with regard to FIGS. 2 and 10), the end-user may further supply an image of the end-user, or end-users, associated with an account. Indeed, the end-user may further supply images of other users who are authorized to the use the account (e.g., a spouse, child, etc.). Alternatively, an image may be pulled from a database managed by a government agency. For example, the Trusted Image Module 808 may be communicatively coupled with the Department of Motor Vehicles (DMV)'s system and configured to employ the end-user's driver's license photograph as the trusted image. Regardless of origin, the Trusted Image Module 808 may consider such images to be trusted images. Accordingly, during a transaction (e.g., an online transaction), the end-user may be instructed to use a camera, such as a camera integrated with a mobile device, to take, or have taken, an image of the end-user's face. In this example, the mobile device may be configured to communicate the image to the Trusted Image Module 808 via the Internet or via the merchant's POS System. That image may then be compared to the one or more trusted images. If the face in the image taken by the end-user is determined to match a face in one of one or more trusted images, the transaction would be authorized.

Similarly, when the transaction occurs at a brick and mortar location, either the end-user or the merchant may be instructed to take the image of the customer. In certain aspects, the merchant's surveillance system may be used to automatically determine if an end-user is present by matching pictures of customer in a store to images pulled from a social media database or a trusted image database. The image may be further authenticated by identifying markers visible in the background, such as street signs, monuments, etc. In certain embodiments, the images taken of the customer during transactions may be further stamped with information, such as the time, date, and location of the transaction. The location of the transaction may be either the physical location of the merchant (e.g., the address of a brick and mortar location) if the transaction occurred in person, the GPS coordinates of the end-user's portable device at the time of the image capture, or a combination thereof.

Because the trusted image process may be burdensome to the end-user if required for every purchase, the Trusted Image Module 808 may be employed only with certain transactions. Indeed, the Trusted Image Module 808 may be configured to automatically launch with large purchases (e.g., purchases in excess of a predetermined value) or purchases that are deemed to be potentially fraudulent by the other modules in the Transaction Authorization System 104. For example, if the Transaction Authorization System 104 determines that the purchase is potentially fraudulent because, for example, the transaction occurred in an abnormal location for an unanticipated item, the end-user may wish to override these modules by launching the Trusted Image Module 808, thus authorizing the transaction.

In certain circumstances, the images taken by the end-user, and associated (e.g., linked) with each transaction, may be communicated over a network and stored to database. Such a system would mitigate fraudulent credit card disputes. For example, if an end-user contests a charge, but the image pulled from the database clearly shows the end-user making the purchase and is properly stamped with the date, time, and location (e.g., "12-31-2013:16:53/41.8833351, −87.6341934"), the transaction would be deemed valid and enforceable against the end-user.

While the identifying feature described with regard to the facial recognition processes and Trusted Image Module 808 is the end-user's face, such processes may be applied using other identifying features, such as iris and fingerprints. That is, the end-user may provide a trusted iris scan and/or trusted fingerprint scan. During the transaction, the user may be prompted to provide, using their portable device or a device at the point-of-sale, an iris or fingerprint scan.

Trusted Profile Module 805.

A social media account may also be verified by determining the age of the account (e.g., the time since the account was first opened or created). Accordingly, a Transaction Authorization System 104 may deem social media accounts created within a predetermined period of time to be untrustworthy. For example, building upon the prior example, an untrusted individual may create a social media account using the identity of his victim for the purposes of generating a second point of authentication. In this case, the Transaction Authorization System 104 would determine that this social media account is too new to be verified and is not trustworthy for the purposes of transaction verification.

At Step 908, it may be useful to build a trusted network of social media accounts. An account is deemed to be more useful for social media transaction authentication if they have linked one, or many other social media accounts to the same name to be sure that a single profile has not been compromised, then a cross-reference of different accounts may be performed. Using a trusted network also provides an additional point of verification because it is increasingly difficult for fraudsters to create multiple fake accounts for a single user across different social media accounts while at the same time preserving the same network of friends or followers across different social media platforms.

Furthermore, at Step 910, the locale and language of a social media network profile may be used to determine if an account is trustworthy by analyzing the spelling/grammar of Posts. For example if a social media account user lists his native language as English, or lives in the United States of America, the system would conduct a spell check of Posts to detect patterns of spelling mistakes, punctuations, and capitalization to determine if a fraudster has either hacked the intended victim's social media account or if the fraudster has created a fake social media account in the victim's name in an attempt to facilitate a fraudulent financial transaction. As the number of linked accounts increases, so does the probability of legitimacy of the accounts.

Turning now to FIG. 14, once a user data source is added to the database, the trusted user data source database may be used to more efficiently authorize future transactions. For example, a transaction may be initiated at Step 1402. The user data source may be identified and received by the system at Step 1404. At Step 1408, the transaction authorization system may query the trusted user data source database to determine if the received user data source (e.g., profile) is trusted. If the profiles are deemed to be trustworthy at Step 1408, then the transaction authorization system would flag the transaction as likely valid (Step 1412). If, at Step 1410, the system, using one or more processors, determines that the accounts cannot be proven to be trustworthy, then the transaction will be flagged for further review (Step 1414).

Another exemplary transaction would be if a first end-user wishes to buy a gift card for himself on Amazon.com at which point that would cause Step 1410 to not deem the transaction trustworthy because there are few use-cases where an end-user would want to purchase a gift card for themselves. There are however valid scenarios where an end-user would assign a digital asset to themselves such as purchasing software or music. For such transactions the flowchart in FIG. 9 would retrieve a first end-user's social media network profile at Step 1404 and form a link between the a first end-user's transaction and a first end-user's own social media network profile at Step 1408 since the digital assets final assignment will ultimately be assigned to a first end-user. Then at Step 1410 the system will leverage the Trusted Profile Module 805 to determine if a first end-user's profile is trustworthy. If, at Step 1410, the system, using one or more processors, determines that a first end-user's profile is trustworthy then the transaction is flagged as likely valid (Step 1412) otherwise the transaction will be flagged for further review (Step 1414).

Historical Profile Transaction Module 806.

Given all the valuable information that may be shared via a third-party information source such as a social media network, it is useful to create a Historical Profile Transaction database that memorializes and stores the transaction and/or user information collected, as well as the social media network profile specifics, at the time of a transaction, which may be analyzed during a transaction by the Historical Profile Transaction Module 806 (Module 806).

For example, if it was determined that an end-user was located at a university bookstore at Massachusetts Institute of Technology ("MIT") in mid-August purchasing books for around $500.00, then it is safe to assume that next time a transaction for $500.00 at a bookstore in MIT in mid-August occurs it is probably a valid transaction because it fits the transaction pattern of the end-user. Furthermore, based on configurable sensitivity settings, not all of the Social Media Data is needed to exactly match to authenticate the transaction. For example, the transaction could occur in mid-January and exhibit the same behavior pattern of a student starting a new semester that the Historical Profile Transaction Module 806 would recognize and flag the transaction as allowable.

Figure 15:
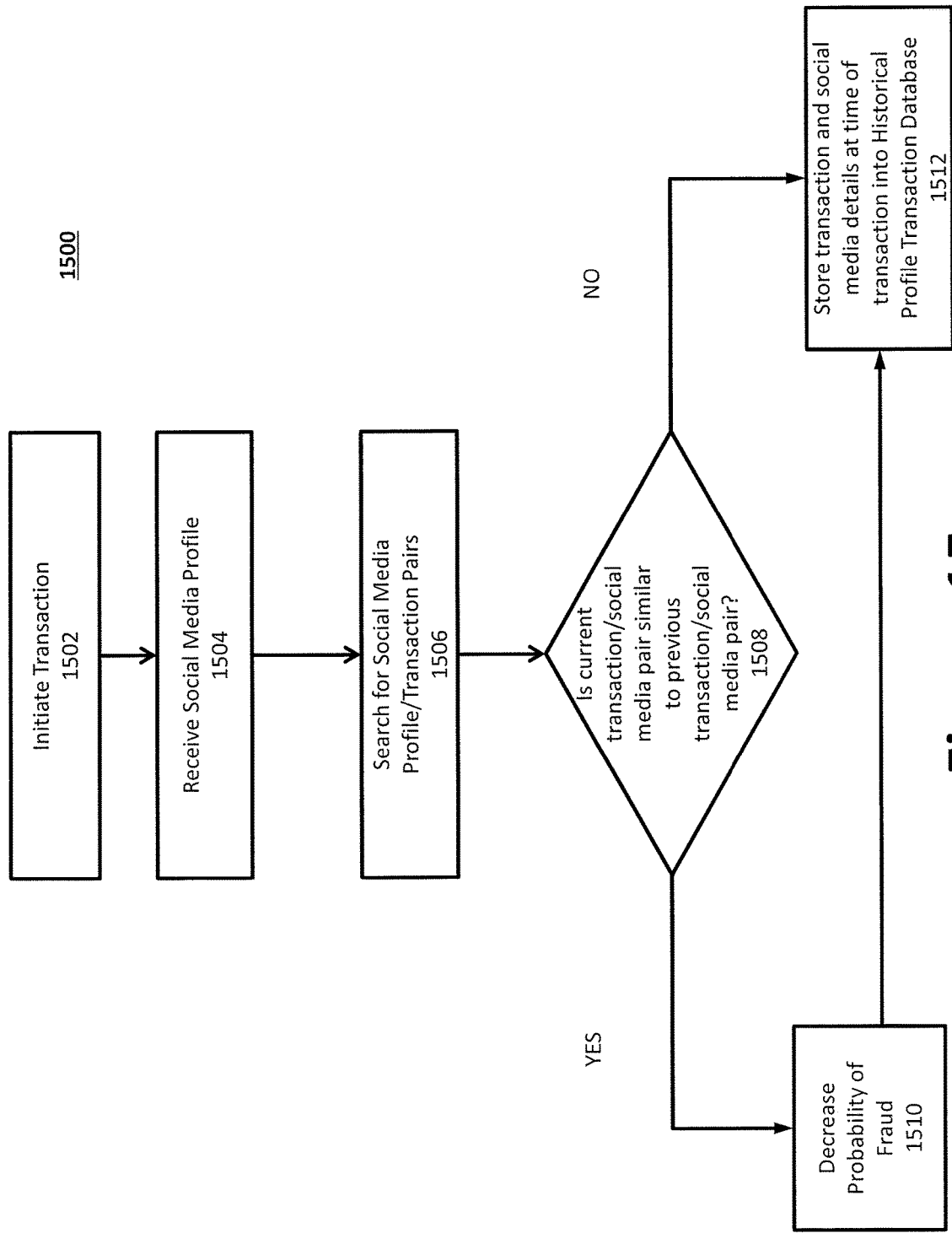
FIG. 15 is a flow chart of an example Historical Profile Transaction Module 806 process.

The flowchart in FIG. 15 further illustrates a second exemplary transaction that occurred in mid-January. The Historical Profile Transaction database may be configured to link transaction data to social media network profile snapshots into a tuple that may be stored in the Historical Profile Transaction database as an atomic unit for future data mining. At Step 1504, the end-user's social media network profile is received after a transaction is initiated at Step 1502. Once received, a similarity score is calculated between the new transaction details/social media network profile tuple and old transaction details/social media network profile tuples at Step 1506 which could be achieved by using well-known information retrieval clustering and similarity ranking algorithms such as cosine similarity measures and probabilistic similarity measures, among others.

If it is determined at Step 1508 that the current social media/transaction data pair is similar enough to a previous social media/transaction data pair, then the probability that the transaction should be allowed is increased at Step 1510. If no match between data pairs is found, then Step 1512 will store the transaction details paired with the social media snapshot at the time for future comparisons. It is important to note that Step 1512 is always executed for the purposes of data warehousing and storage for future transaction and social media network profile matching.

Given that the Historical Profile Transaction Module 806 can service a number of distinct merchants, financial institutions, and other transaction providers, it can provide a full picture of what the end-user was doing socially at the time of the transaction, while also storing transaction details for all financial transaction providers and aggregate the data into the Historical Profile Transaction database as opposed to traditional financial institutions that only have data on their own transactions without a social media network profile snapshot, which may be detrimental to the efficiency and accuracy of their fraud detection algorithms and heuristics.

Moreover, as noted above, traditional financial transaction systems often use heuristics and/or machine-learning algorithms to authorize a transaction. Unfortunately, when a new account holder (e.g., end-user) is acquired, no user data is available. Thus, the financial institution must start from scratch by training their fraud detection algorithm systems to learn about the new account holder and the new account holder's spending habits. As expected, this is a waste of time and money. However, the above-described Historical Profile Transaction database obviates the need to start from scratch as it can be used as an input as training data for a new account holder to a heuristic and/or machine-learning fraud detection system. For example if the Historical Profile Transaction database contains information about a new end-user's transactions and social media network profile, that profile can be used a starting point for fraud detection for a bank issuing a new card to the new end-user. Accordingly, a bank, for example, would no longer have to start their fraud detection algorithms with an empty data set but could use well-known profiles that fit the new user's historical transaction/social media network profile data.

It may not always be necessary, or desirable for a computer to make the final decision as to whether a transaction should be allowed or denied. Indeed, transactions may be authorized or denied based on information, which may be presented to a transaction operator such as a cashier, checkout attendant, transaction supervisor, or transaction reviewer. A point-of-sale terminal can display data retrieved from a third-party information source when an end-user initiates a transaction. The displayed information may then be inspected by the transaction operator who will then decide if the transaction should be authorized or declined.

For example, a trusted image may be communicated to the point of sale and displayed to the transaction operator at the point of sale during the transaction, but prior to authorization of the transaction. In this example, the transaction operator would be instructed to confirm whether or not the customer matches the person depicted in the trusted photo. The transaction operator may then indicate whether or not there is a match via the point of sale device (e.g., via a touch screen, mouse, keyboard, or other input device).

Figure 16:
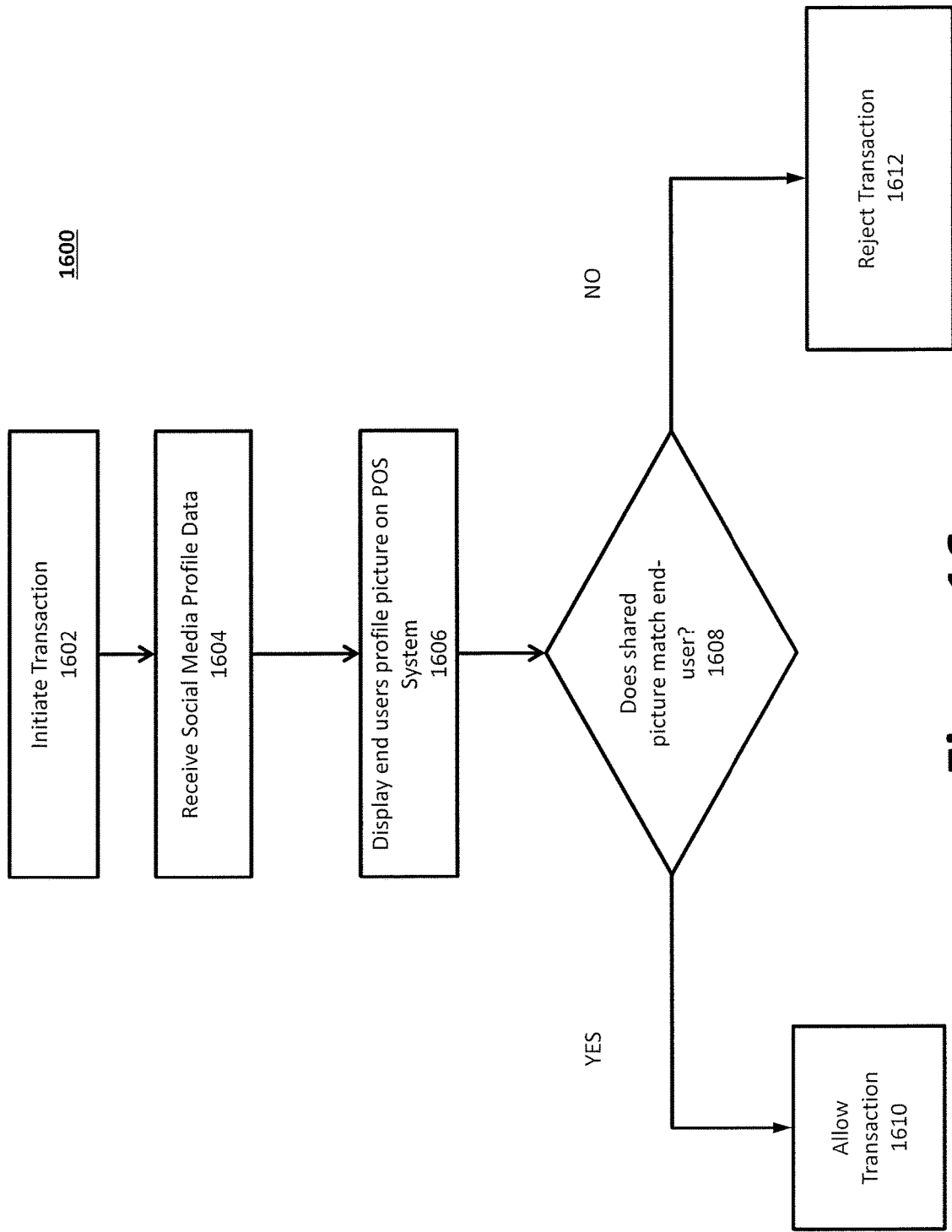
FIG. 16 is a flow chart of an example Photo Confirmation Transaction Module process.

The flowchart in FIG. 16 illustrates an exemplary transaction in which an end-user initiates a purchase of item from a merchant. In this example, the end-user has previously linked the end-user's social media account with the merchant's POS system provider as shown in FIG. 2. As part of the checkout process, the end-user initiates a transaction at Step 1602. At Step 1604, the POS System may receive social media profile information, which may be processed for display on a POS System display at Step 1606. Continuing with the example transaction, Step 1606 would display, for example, the end-user's full name, profile image (e.g., a photograph), date of birth, age of social media account, and last known location, which would be made visible, or otherwise available, to the merchant's checkout attendant. The checkout attendant would look at the displayed information to determine whether the transaction is valid or not. In this case the checkout attendant would look at the user that initiated the transaction and compare the customer's face to the profile image associated with the account holder (e.g., end-user), which may be retrieved from their corresponding social media account. At Step 1608, if the checkout attendant determines that the displayed image matches the appearance of the customer then the transaction would be allowed at Step 1610, otherwise the transaction would be denied at Step 1612. For example, the checkout attendant's determination may be communicated to the Transaction Authorization System 104 as an authorize command or deny command.

As discussed above, rather than relying on complex fraud detection heuristics, the Transaction Authorization System 104 leverages trusted data (e.g., third-party data, such as social media data) to cross reference information available during the transaction process with information available from social media accounts. Through the above-described methods, the Transaction Authorization System 104 may establish, or calculate, trust score value. In other words, the Transaction Authorization System 104 may build a trust score value that indicates the trustworthiness of a transaction. Using the trust score value provided by the Transaction Authorization System 104, merchants and fraud screening systems can limit false positives in fraud detection and decrease the number of transactions, which must undergo manual review and negatively impact customer experience.

For example, the trust score value may be a number between 0 and 100 that indicates the authenticity of the transaction, or transactions, so that it can be allowed, denied, or flagged for manual review. That is, the transaction allowed if the trust score value meets a preset, or predetermined, approve threshold score. Correspondingly, the transaction may be denied if the trust score value is less than a preset, or predetermined, fraudulent threshold score. Finally, as discussed above, the transaction may be flagged for further review (e.g., other modules may be employed, manual review, etc.) if the trust score value is less than the approve threshold score, but meets or exceeds the fraudulent threshold score.

Indeed, through the above-described modules, a trust score value may be calculated by comparing attributes provided during a transaction against information (e.g., trusted data attributes) that the Transaction Authorization System 104 has collected from third-party data sources (e.g., social media websites/accounts, etc.). As discussed above, the various trusted data attributes may include approved merchants, product categories, name, location, phone number, home address, etc.

For instance, a score of 0 may indicates that none of the trusted data attributes were matched against the provided transaction data. When the Transaction Authorization System 104 matches one or more trusted data attributes to data provided in the transaction, the trust score value is increased pursuant to one or more predetermined algorithm. Indeed, certain data sources may be given a greater weight, thereby indicated higher trustworthiness. Thus, a trust score value of 100 would indicate that all of the trusted data attributes were verified and the Transaction Authorization System 104 recommends the transaction be allowed. However, as noted above, a trust score value of 100 is merely exemplary of an approve threshold score. That is, the Transaction Authorization System 104 may recommend that a transaction be allowed when the trust score value meets any predetermined approve threshold score, which may be established by the financial institution or operator of the Transaction Authorization System 104.

Another advantage of the Transaction Authorization System 104 is its ability to be easily integrated with existing systems. Indeed, Transaction Authorization System 104 processing may provide fraud screening as a service with a simple, clean, and secure API which can be easily integrated into the checkout process of an online store, point-of-sale system, or existing fraud screening solutions. For example, FIG. 17 provides example objects for use in connection with transaction authorization system processing.

Figure 18:
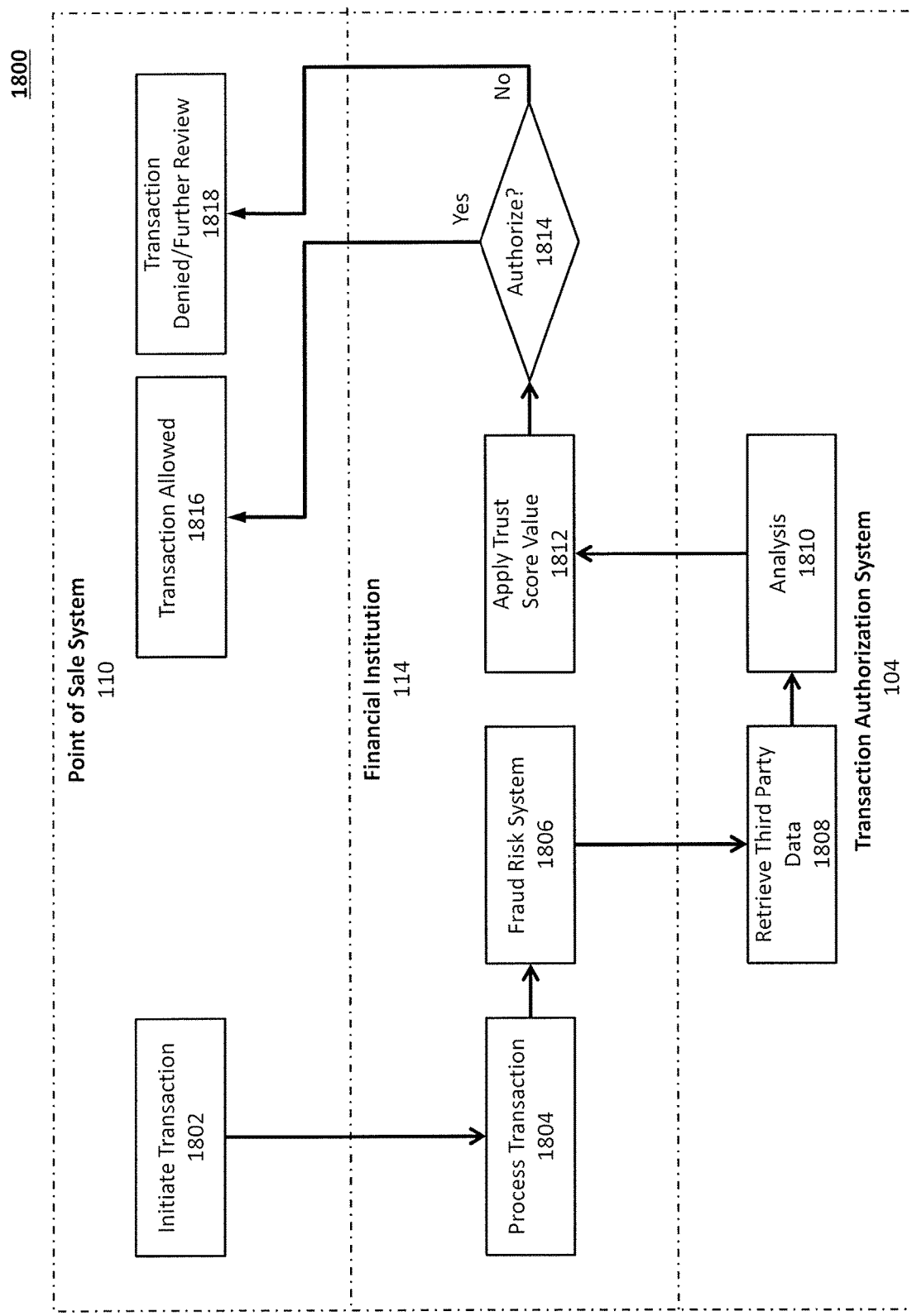
FIG. 18 illustrates an example block diagram of an Enhanced Transaction Authorization System processing being employed through existing transaction processing workflows.

FIG. 18 illustrates an example block diagram 1800 of Enhanced Transaction Authorization System 100 processing being employed through existing transaction processing workflows to provide better transaction authentication to merchants simultaneously being invisible to the end-user. Specifically, as illustrated, an end-user may initiate a transaction 1802 via a POS System 110 (e.g., a Merchant, whether in person or through a network). The transaction request may then be received and initially processed 1804 by a financial institution 114. As discussed above, in certain aspect, the POS System 110 and financial institution 114 may be a single system or entity whereby the financial institution 114 facilitates and/or operates the POS System 110. The financial institution 114 may employ a fraud risk system 1806 to determine whether the transaction is potentially fraudulent. In doing so, the financial institution 114 may communicate with a Transaction Authorization System 104 configured to provide the above-described Enhanced Transaction Authorization System 100 processing. The financial institution 114 may be further configured to perform traditional fraud detection heuristics. The Transaction Authorization System 104 may retrieve third party data at 1808 and analyze the third party data vis-à-vis the transaction data at 1810 as described in connection with the various Transaction Authorization System 104 modules or via another comparing technique e.g., using direct matching, fuzzy matching). At 1810, the Transaction Authorization System 104 may further generate a trust score value. The trust score value may be communicated to the financial institution 114 and applied at Step 1812. At 1814, the financial institution 114 may use the trust score value to determine whether to authorize or not authorize the transaction. If the financial institution 114 determines that the transaction should be authorized at Step 1814 (e.g., based in part on the trust score value), the transaction may be allowed at step 1816 via the POS system 110. If the financial institution 114 determines that the transaction should not be authorized at step 1814 (e.g., based in part on the trust score value), the transaction may be denied or communicated to another module for review (whether automated or manual review) at Step 1818. While three separate entities are illustrated; one of skill in the art would recognize that one or more steps may be performed by another entity, or by a single entity. For example, in a situation where the financial institution 114 offers POS functionality, the financial institution 114 and point of sale system 110 may be the same entity.

In certain aspects, the Transaction Authorization System 104 may be configured to take a predetermined emergency action when a predetermined distress action is taken by the end-user. For example, the end-user may indicate to the Transaction Authorization System 104 that an ATM would not be used in connection with a particular account but for extreme emergency (e.g., a criminal is forcing the end-user to withdraw cash during a crime). In such an example, the Transaction Authorization System 104 may permit a predetermined cash withdrawal (e.g., a limited amount, or even zero), while simultaneously contacting the authorities. To mitigate the likelihood of false alarms, or in instances where the end-user wishes to use ATMs, the predetermined distress action may be the input of a predetermined distress code at an ATM. For example, the Transaction Authorization System 104 may require that the end-user input a predetermined distress code as a PIN number so as to indicate the emergency (e.g., the PIN for traditional withdrawals may be 1234, while the distress code is 4321).

The above-cited patents and patent publications are hereby incorporated by reference in their entirety. Although various embodiments have been described with reference to a particular arrangement of parts, features, and the like, these are not intended to exhaust all possible arrangements or features, and indeed many other embodiments, modifications, and variations will be ascertainable to those with skill in the art. Thus, it is to be understood that the invention may therefore be practiced otherwise than as specifically described above.

What is claimed is:

1. A transaction authorization system for managing financial transactions, the transaction authorization system comprising:
   a user social media account, wherein said social media account is associated with a user social media account identification and includes a trusted location database, wherein said trusted location database represents a set of one or more predetermined trusted geographic locations selected by said user;
   a financial institution computerized system, wherein said user links said user social media account with said financial institution computerized system by providing login information for said user social media account to said financial institution computerized system, wherein said login information is stored at said financial institution computerized system, wherein said login information is usable by said financial institution computerized system to access said user social media account; and
   a financial institution database in communication with said financial institution computerized system wherein said user social media account identification is associated with financial account data stored in said financial institution database, so that said financial account data is usable to determine said user social media account identification;

wherein said transaction authorization system:
  receives, from a computerized merchant transaction system, transaction data associated with a proposed financial transaction, wherein said transaction data includes transaction location data and transaction financial account data;
  uses said transaction financial account data to retrieve from said financial institution database a user social media account identification associated with said transaction financial account data;
  uses said user social media account identification to determine login information associated with said user social media account identification and uses said login information to access said social media account and retrieve said set of one or more predetermined trusted geographic locations associated with said user social media account identification,
  compares said transaction location data with said set of one or more predetermined trusted geographic locations, and
  transmits transaction authorization data to said computerized merchant transaction system to authorize said proposed financial transaction only when said transaction location data represents a geographic location less than a stored predetermined geographic distance from a location included in said set of one or more predetermined trusted geographic locations.

2. The transaction authorization system of claim 1 wherein at least one of said set of one or more predetermined trusted geographic locations selected by said user is associated with a start time and a stop time.

3. The transaction authorization system of claim 2 wherein said transaction data also includes transaction time data,
  wherein said transaction authorization system authorizes said proposed financial transaction only when said transaction location data represents a geographic location less than a stored predetermined geographic distance from a location included in said set of one or more predetermined trusted geographic locations, and said transaction time data is after said start time associated with said location and before said stop time associated with said location.

* * * * *